Oct. 12, 1965  F. L. PUTZRATH  3,211,832
PROCESSING APPARATUS UTILIZING SIMULATED NEURONS
Filed Aug. 28, 1961  9 Sheets-Sheet 1

INVENTOR.
FRANZ L. PUTZRATH
BY
ATTORNEY

Oct. 12, 1965    F. L. PUTZRATH    3,211,832
PROCESSING APPARATUS UTILIZING SIMULATED NEURONS
Filed Aug. 28, 1961    9 Sheets-Sheet 2

INVENTOR.
FRANZ L. PUTZRATH
BY
ATTORNEY

Oct. 12, 1965   F. L. PUTZRATH   3,211,832
PROCESSING APPARATUS UTILIZING SIMULATED NEURONS
Filed Aug. 28, 1961   9 Sheets-Sheet 3

INVENTOR.
FRANZ L. PUTZRATH
BY Morris ...
ATTORNEY

Oct. 12, 1965 F. L. PUTZRATH 3,211,832
PROCESSING APPARATUS UTILIZING SIMULATED NEURONS
Filed Aug. 28, 1961 9 Sheets-Sheet 5
Fig. 18.
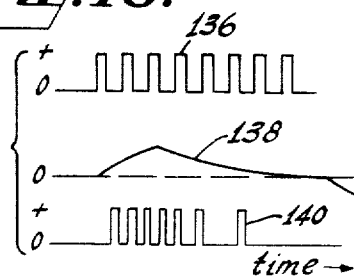
Fig. 19.
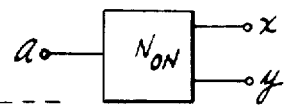
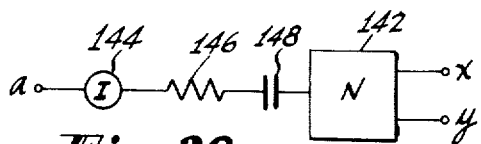
Fig. 20.
Fig. 21.
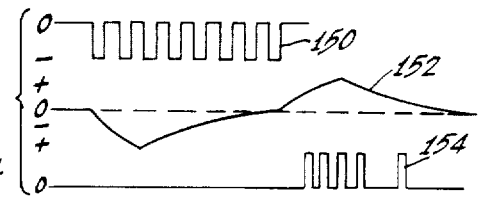
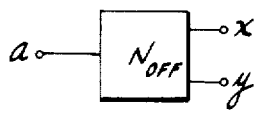
Fig. 22.
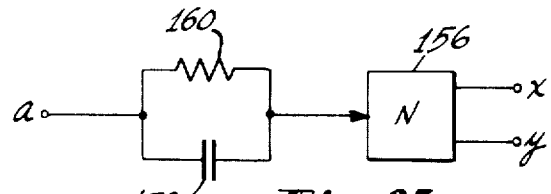
Fig. 23.
Fig. 24.
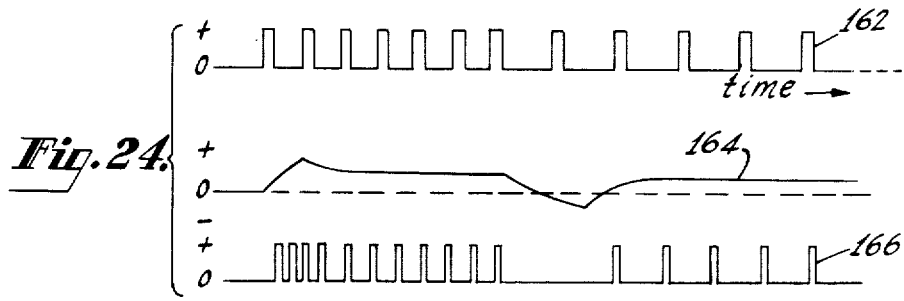
INVENTOR.
FRANZ L. PUTZRATH
BY
ATTORNEY

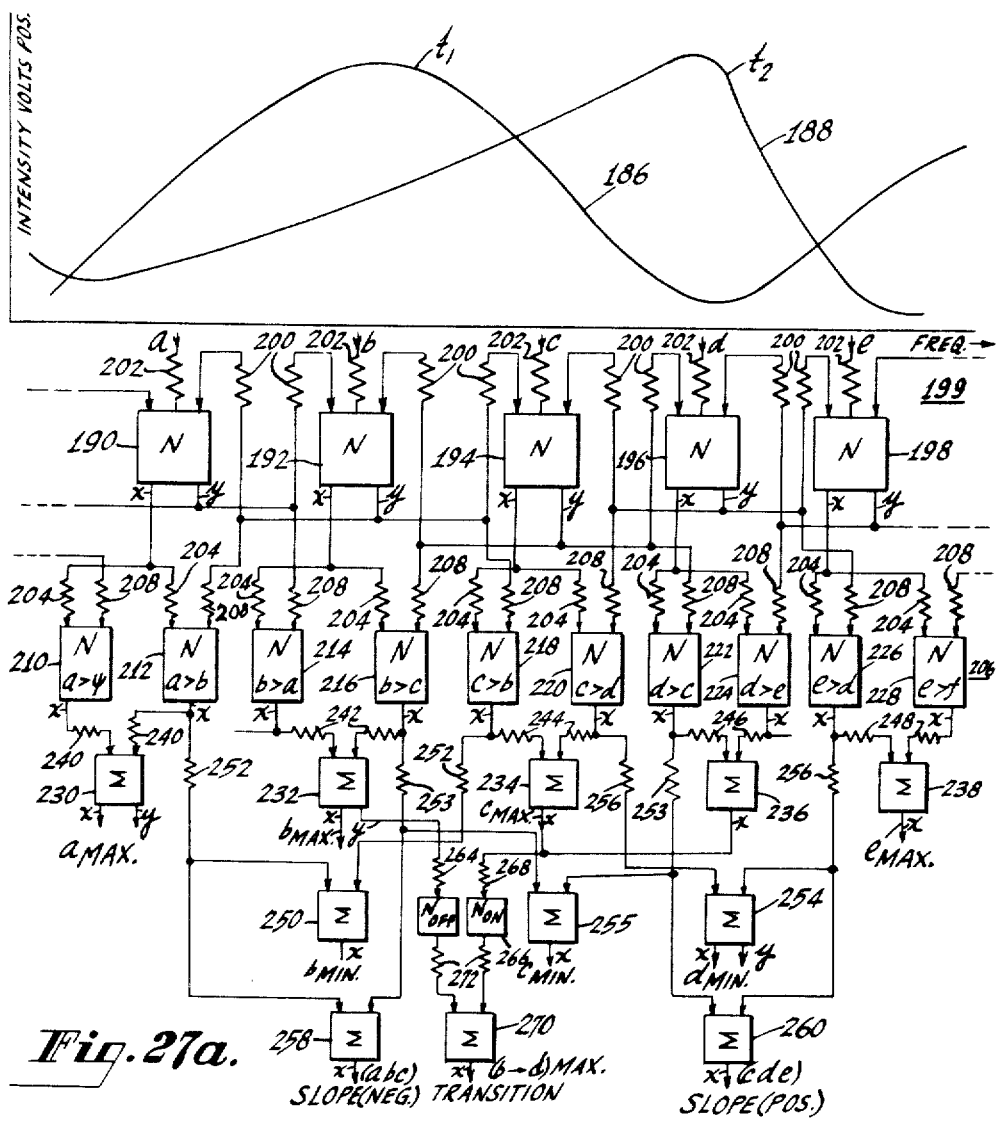
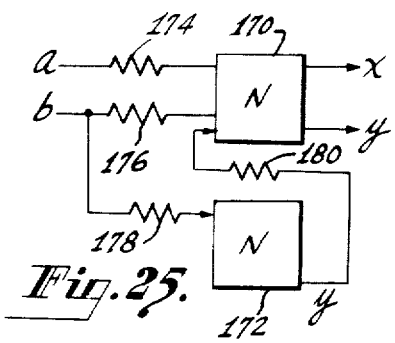
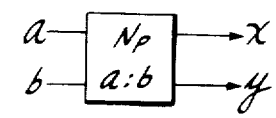
Fig. 27a.
Fig. 25.
Fig. 26.

Oct. 12, 1965   F. L. PUTZRATH   3,211,832
PROCESSING APPARATUS UTILIZING SIMULATED NEURONS
Filed Aug. 28, 1961   9 Sheets-Sheet 7

INVENTOR.
FRANZ L. PUTZRATH
BY Morris L. Rabkin
ATTORNEY

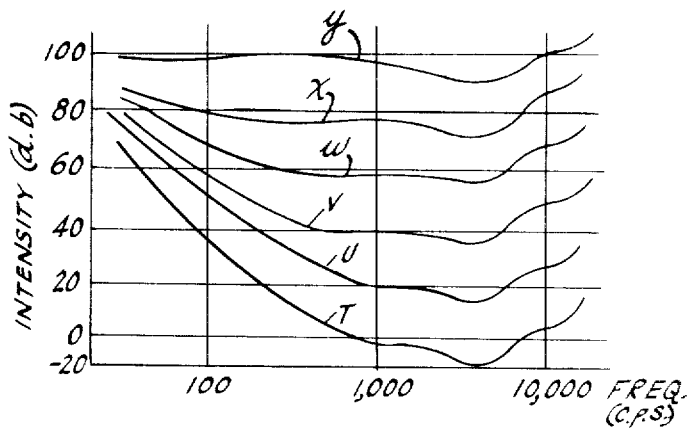
Fig. 29.
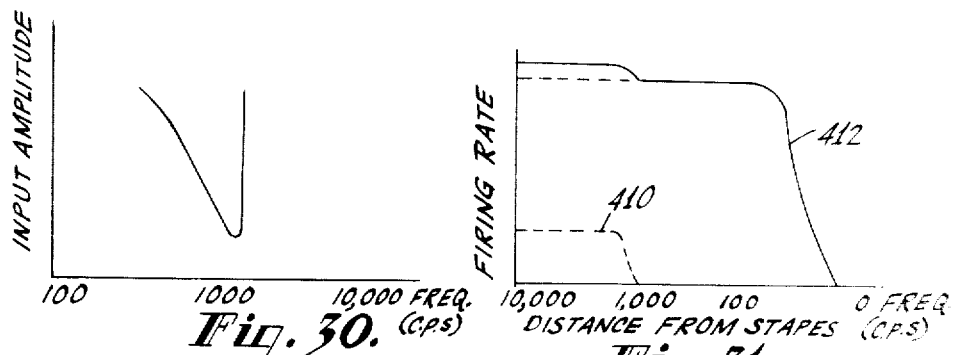
Fig. 30.
Fig. 31.
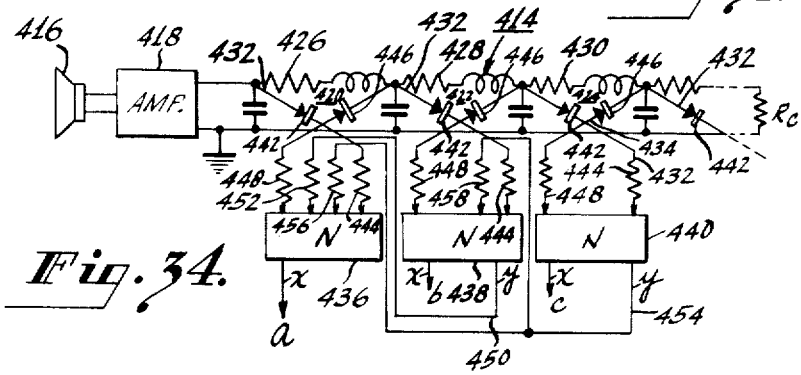
Fig. 34.

United States Patent Office 3,211,832
Patented Oct. 12, 1965

3,211,832
PROCESSING APPARATUS UTILIZING SIMULATED NEURONS
Franz L. Putzrath, Oaklyn, N.J., assignor to Radio Corporation of America, a corporation of Delaware
Filed Aug. 28, 1961, Ser. No. 134,431
7 Claims. (Cl. 179—1)

The present invention relates to information processing apparatus, and more particularly to electrical apparatus for recognizing patterns, such as speech patterns, by simulated neural processes.

The invention is especially suitable for providing electrical networks and systems for analyzing patterns, such as the sound patterns which exist in speech, and for logically processing information obtained from such patterns so as to recognize certain speech sounds. The invention is also generally useful for translating information into electrical signals suitable for logical processing, and for logically processing the information represented by such signals.

As of the present time, there are no known electrical systems which are capable of abstracting information and processing such information with the same facility as the biological nervous system. By the biological nervous system is meant the receptor organs, such as the ear and other sense organs, the brain, and the nerve networks interconnecting the receptor organs and the brain. Biological nervous systems have been studied. These studies are discussed in the Handbook of Experimental Psychology, chapter 2, pages 50–93 (John Wiley and Sons, New York, 1950). The basic building blocks of the biological nervous system are neurons which generate electrical impulses by a complex cycle of electrochemical changes. The neurons have two states, active or inactive. The neurons fire, or become active, in response to excitation of greater than a threshold intensity. Neurons also respond to intensity. The number of firings in a given time interval increases as the intensity rises. The number of firings, however, saturates to a maximum number which biological research has found to be around 300 pulses per second. The saturation effect occurs because the electrochemical processes in the nerves, which are believed responsible for the generation of each impulse, require a recuperative period between firings. This recuperative period is called the refractory period.

Attempts have been made to artificially mechanize biological neurons. Circuits have been provided which provide pulses in response to excitation of intensity greater than a given threshold intensity, which have refractory periods between output pulses and which have other properties of biological neurons. Known artificial neurons, for the most part, have not been adapted to perform logical functions, such as determining whether or not different events have taken place, whether one event preceded another, whether the events occurred simultaneously or sequentially, and the like. The input and output characteristics of artificial neurons have made them unsuitable for information processing where a large amount of information is involved. Biological nervous systems are known to be capable of processing a very large amount of information almost simultaneously. Most known artificial neurons are impractical for handling complex information in large quantities without introducing noise and other signal distortions.

Nerve networks of biological nervous systems are believed to logically process information by numerous logical operations having both digital and analog characteristics. It is desirable to perform similar logical operations using circuit neurons. A complex variety of logical functions are also performed by an entire biological nervous system in the abstracting and processing of information. It is also desirable to artificially perform logical functions of similar complexity with systems of circuit neurons and circuit neuron networks.

It is an object of the present invention to provide apparatus which operates in principle more like the nervous system of the human ear than prior known apparatus.

It is a still further object of the present invention to provide improved apparatus which artificially mechanizes the human cochlear nervous system.

It is a still further object of the present invention to provide an improved sound analysis system which simulates psychoacoustic phenomena.

It is a still further object of the present invention to provide an improved system for analyzing speech which operates like the human cochlea.

An artificial cochlea has been proposed which is a combination of a multi-section low-pass filter or transmission line and a plurality of circuit neurons connected to different points along the line. An artificial cochlea according to the invention includes weighted inhibitory and excitatory connections between the circuit neurons and the transmission line. The invention also involves an arrangement of the circuit neurons in successive levels. The neurons of the second lever respond to the neurons of the first level and obtain outputs corresponding to different frequency components of a sound in a manner which closely simulates the psychoacoustic characteristics of the human cochlea. The outputs of the second level neurons may be applied to a neural system for abstracting the significant features of sounds and for recognizing certain sounds.

Circuit neurons which have been proposed for use in apparatus provided by the present invention involve a system of circuits including an input circuit for combining a plurality of excitatory and inhibitory inputs which occur over a given period of time. A threshold circuit maintains the neuron quiescently in its inactive state. When the excitatory inputs exceed the inhibitory inputs and a built in threshold, the neuron becomes active or fires. A pulse generator operated by the threshold circuit translates the amount by which the excitatory inputs exceed the inhibitory inputs and the threshold into an output pulse rate. Corresponding output pulses so provided have excitatory and inhibitory characteristics. The system of circuits also includes a circuit which introduces refractory characteristics in the neuron whereby the output pulse rate varies non-linearly with increasing excitatory stimulation The terms "neuron" and "neural," as used herein, designate stimulated neurons, neural networks and neural systems, except where these terms obviously designate biological neurons, networks and systems from the context in which they are used.

The invention itself, both as to its organization and method of operation, as well as additional objects and advantages thereof, will become more readily apparent from a reading of the following description in connection with the accompanying drawings in which:

FIG. 18 illustrates three waveforms from different points in the network of FIG. 17;

FIG. 19 is a block diagram of a symbol which represents the neural network of FIG. 17;

FIG. 20 is a partially block, partially schematic diagram of the neural network which responds to the cessation of an input;

FIG. 21 illustrates three waveforms from different points in the network of FIG. 20;

FIG. 22 is a diagram of a symbol representing the neural network of FIG. 20;

FIG. 23 is a partially schematic, partially block diagram of a neural network for determining changes in an input;

FIG. 24 illustrates three waveforms from different points of the network of FIG. 23;

FIG. 25 is a partially block, partially schematic diagram of a neural network which determines the priority of two inputs with respect to each other;

FIG. 26 is a diagram of a symbol representing the neural network of FIG. 25;

Figure 27B:
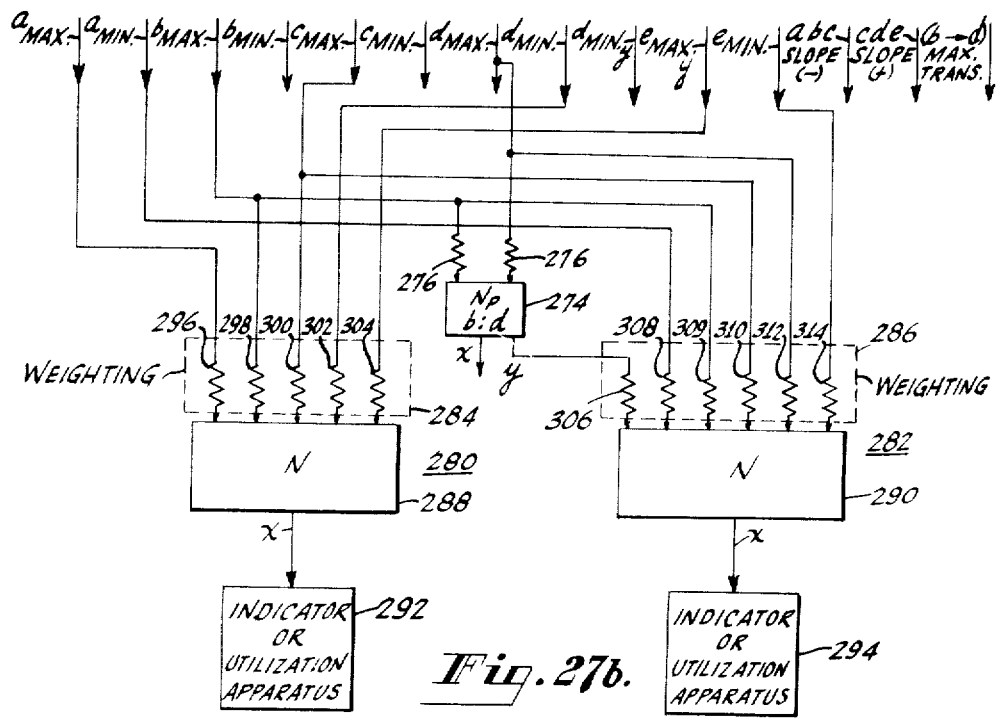
Figure 28:
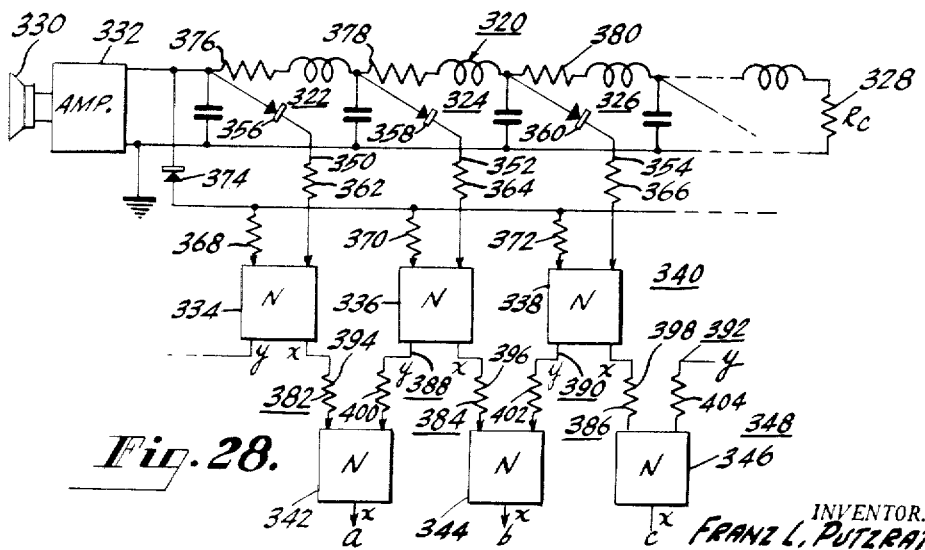
Figure 32:
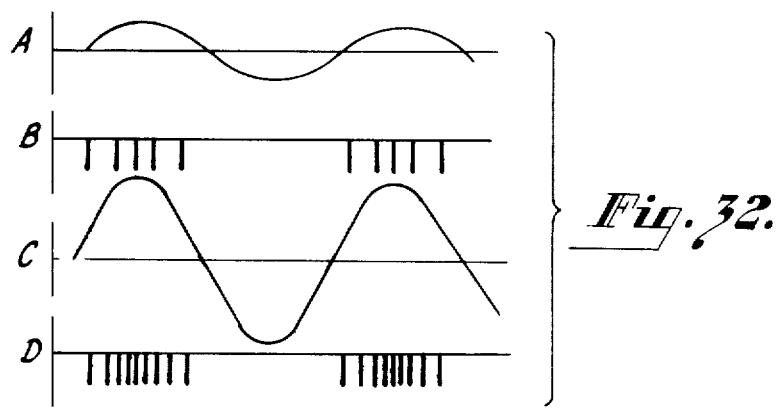
Figure 33:
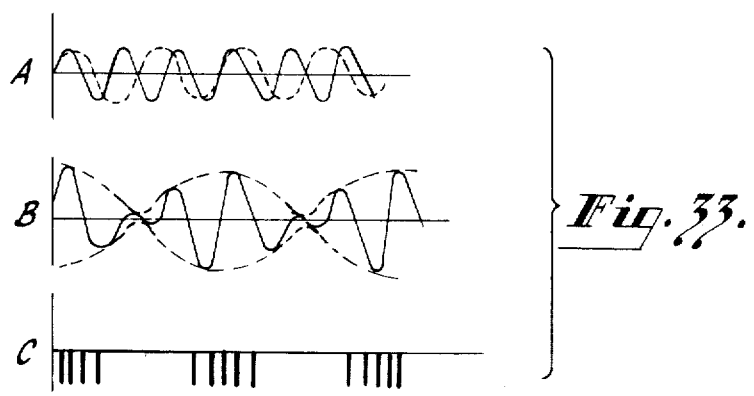

FIG. 27a and FIG. 27b, taken together is a partially schematic, partially block diagram of a portion of system of neural networks for logically processing information represented by a plurality of inputs, and also showing a pair of curves illustrating such inputs;

FIG. 28 is a fragmentary, partially schematic, partially block diagram showing a system which functions as an artificial cochlea and is useful for speech analysis;

FIG. 29 illustrates a family of curves of loudness level variations with frequency which are simulated by the system of FIG. 28;

FIG. 30 illustrates a curve representing the response characteristic of the system shown in FIG. 28 for sounds of about 2000 c.p.s.;

FIG. 31 illustrates a curve representing the psychological phenomena of masking which is simulated by the system shown in FIG. 28;

FIG. 32 illustrates a series of waveforms obtainable with the system of FIG. 28;

FIG. 33 illustrates another series of waveforms obtainable with the system of FIG. 28; and FIG. 34 is a fragmentary, partially block, partially schematic diagram of another system which artificially simulates a cochlea and is useful for speech analysis.

*Electrical circuit neurons*

Figure 1:
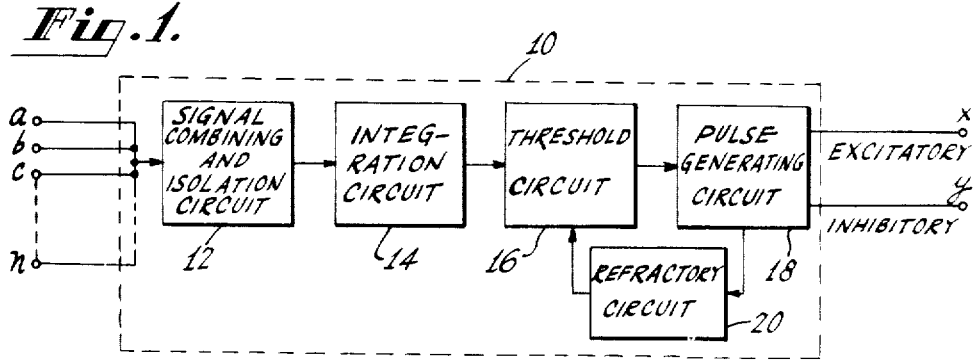
FIG. 1 is a block diagram of an electrical circuit neuron.

Referring more particularly to FIG. 1, there is shown a system of circuits which provides an electrical circuit neuron 10. A plurality of inputs $a$ to $n$, which may be inhibitory or excitatory, are applied to a signal combining and isolation circuit 12. These inputs may be pulse trains or analog signals. This circuit has a low input impedance and a high output impedance and effectively isolates the inputs from the remainder of the circuits of the neuron 10. The combined outputs are applied to an integration circuit 14 having a sufficiently long time constant to accumulate inputs which occur over a finite time. The integration circuit provides temporal properties (response to input signals which occur over a finite period of time) in the neuron 10.

The output of the integration circuit 14 is applied to a threshold circuit 16 which fires when the integrated sum of the inputs exceeds a certain threshold level. This threshold level is denoted by the symbol $\theta$. When the threshold circuit fires, it operates a pulse generating circuit 18 to generate a pulse. By "firing" or "fires" is meant that the state of the circuit is changed from its inactive quiescent state to its active state so as to provide an output signal. The pulse generating circuit 18 provides an excitatory pulse on its $x$ output, and an inhibitory pulse on its $y$ output. The pulse generating circuit 18 has a low output impedance which permits it to be coupled to other circuit neurons without additional impedance matching circuits. The excitatory and inhibitory pulses are bi-polar and complementary. Thus, the excitatory pulses may be positive voltage pulses and the inhibitory pulses may be negative voltage pulses. The excitatory and inhibitory pulses are of equal amplitude so as to facilitate equal strength excitation and inhibition of other neurons.

The pulse generating circuit and the threshold circuit are also interconnected by a "refractory" circuit 20 which prevents the threshold circuit from firing the pulse generating circuit while a pulse is being generated and for a predetermined period thereafter. The refractory circuit also provides a non-linear analog response from the circuit neuron such that the output pulse rate, both excitatory and inhibitory, will depend upon the extent to which the input signal magnitude exceeds the threshold for neuron firing.

Figure 2:
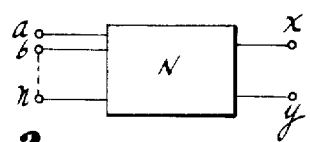
FIG. 2 is a block diagram used hereinafter to symbolize an electrical circuit neuron of the type illustrated in FIG. 1.

A symbol for the electrical circuit neuron which is used in the drawing is shown in FIG. 2. This symbol is a rectangular block inscribed with the letter N. A plurality of inputs $a$ to $n$, inclusive, may be applied to the neuron. The excitatory output is labeled with the letter $x$ and the inhibitory output is labeled with the letter $y$.

Figure 3:
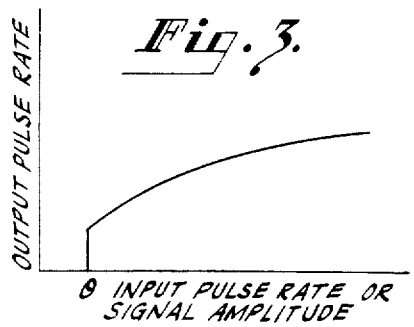
FIGS. 3 to 5 are curves showing different input-output characteristics obtainable with the electrical circuit neuron shown in FIG. 1.

The normal input-output characteristic of the circuit neuron 10 is shown in FIG. 3. The abscissa of the curve is calibrated in terms of either the input pulse rate or signal amplitude for excitatory (positive) signals, as the case may be. The ordinate is calibrated in terms of the pulse rate of the pulse train obtainable either at the excitatory or at the inhibitory output. The neuron does not fire or generate an output pulse until the threshold $\theta$ is reached. After the threshold is exceeded, the output pulse rate increases as a non-linear function of the input pulse rate or signal amplitude and depends upon how much the input pulse rate or signal amplitude exceeds the threshold. The output pulse rate saturates at a maximum pulse rate which is established by the refractory circuit 20. The curve of FIG. 3 illustrates that the neuron 10 has analog and digital properties. The digital properties are that the neuron is either firing or non-firing and depends upon the inputs exceeding or not exceeding the threshold. The analog property is the output pulse rate or the rate at which the neuron fires.

Figure 4:
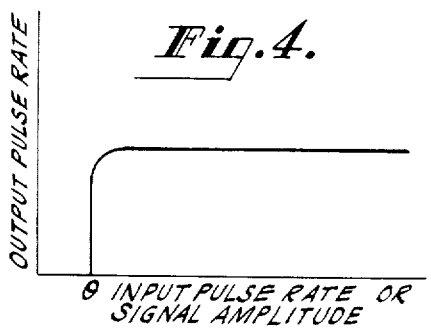
Figure 5:
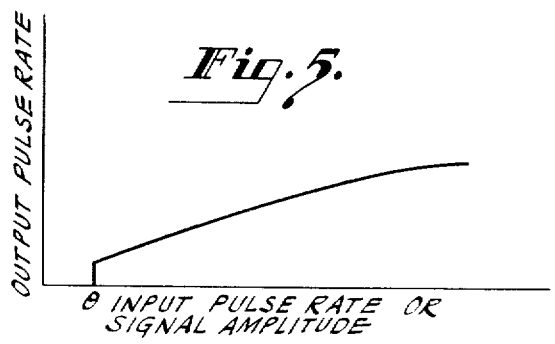

The input-output characteristic shown in FIG. 4 is obtainable by excitatory feedback; that is, as soon as the threshold is exceeded above a certain threshold $\theta$, sufficient excitation is fed back to the input circuit to maintain the input to the circuit above $\theta$. FIG. 5 shows input-output characteristic obtainable by inhibitory feedback. Saturation in the output pulse rate requires a greater input pulse rate, for example, when inhibitory feedback is used.

Figure 10:
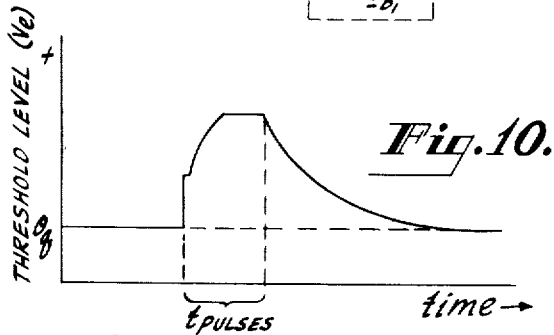
FIG. 10 illustrates a waveform which occurs during operation of the circuit shown in FIG. 9.

The circuit neuron 10 has (1) summation of inputs, (2) short term memory or temporal characteristics, (3) built-in threshold, (4) output pulses, and (5) refractoriness, which biological research has shown to be inherent in biological neurons. The circuit neuron of FIG. 10, however, also has characteristics which make it practical for use in complex neural networks and neural systems. These characteristics are (1) low input and output impedances, (2) integration circuits isolated from the input connections so that the integration time constant is independent of the impedance of the input connections, (3) equal excitatory and inhibitory capabilities, (4) complementary, bipolar outputs, and (5) controllable refractoriness for obtaining a desired input-output characteristic. These characteristics will be more clearly understood from a discussion of the circuits of neurons of the type shown in FIG. 1 which follows.

Figure 6:
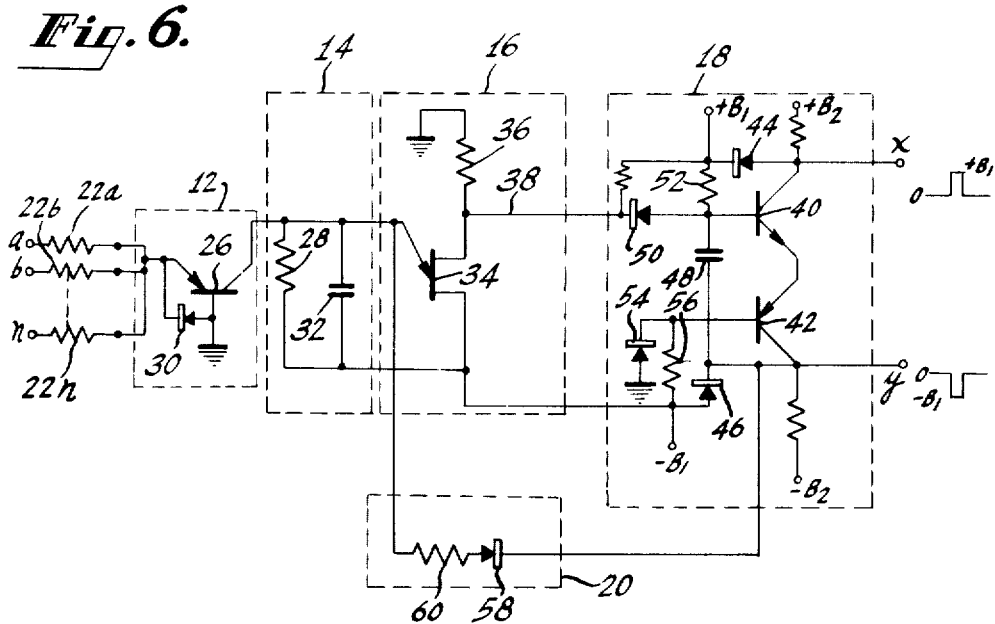
FIG. 6 is a schematic diagram of a neuron of the type shown in FIG. 1.

In the circuit neuron shown in FIG. 6, the input signals $a$ to $n$ are applied through resistors $22a$–$22n$, inclusive, to the signal combining and isolating circuit 12. These resistors may be of different values of resistance for signal weighting purposes. Signal weighting plays a prominent part in many of the neural networks to be described hereinafter. The signal combining and isolating circuit is a common base transistor amplifier using a P-N-P transistor 26. The collector of the transistor 26 is reverse biased by voltage which is applied thereto from a source of operating potential $-B_1$ which is connected to the collector through a resistor 28 in the threshold circuit 16. Since the collector is reverse biased, the common base amplifier has a relatively high output impedance, for example 500 kilohms. The input impedance of the common base amplifier is relatively low and may, for example, be less than 100 ohms. A diode 30 is connected between the base and the emitter of the transistor 26 to prevent the input impedance from becoming high should the net input current go negative and to protect the transistor against high magnitude reverse currents which might cause emitter to base breakdown. The current gain of the transistor amplifier in the circuit 12 is approximately unity. Accordingly, a signal corresponding to the sum of the input signal currents flows out of collector of the transistor 26. Since the input impedance of the common base amplifier including the transistor 26 is very low as compared to the resistance of the weighting resistors, a large number of inputs may be connected to the circuit 12 without significantly affecting the accuracy of the summation. Since the signals are summed across the low input impedance of the circuit 12, the sum of the inputs will be the same regardless of the number of inputs and will depend only upon the magnitude of the signals applied at the inputs.

The integration circuit 14 includes the resistor 28 and a capacitor 32. The time constant of this circuit is independent of the resistance of the input connections, since the common base amplifier of the circuit 12 has a high output impedance.

The threshold circuit 16 includes a unijunction transistor 34 which has its input electrode connected to the integration circuit 16 output. For a description of unijunction transistors, reference may be had to General Electric Transistor Manual, fifth edition (General Electric Co., Liverpool, N.Y., 1960), section 13, pp. 138 et seq. The threshold level $\theta$ of the unijunction transistor is set by the source of operating voltage $-B_1$. The characteristics of a unijunction transistor are that its output impedance is high until a voltage exceeding the threshold level is applied to its control electrode. Then, the output impedance measured between the output electrodes of the transistor 34 drops, for example from 15 kilohms to 5 kilohms. Accordingly, a negative going pulse appears at the output 38 of the unijunction transistor 34 when the signal at the control electrode of the transistor 34 exceeds the threshold level.

The pulse generating circuit 18 includes complementary transistors 40 and 42 which, respectively, are of N-P-N and P-N-P types. The collector to emitter junctions of the transistors 40 and 42 are in series between sources of operating voltage $+B_2$ and $-B_2$. The transistors 40 and 42 are, respectively, biased to saturation in their quiescent state by the source of operating voltage $+B_1$. Quiescently, the outputs $x$ and $y$ are at approximately zero volts, since both transistors 40 and 42 are saturated and their collectors are connected to sources of operating voltage $+B_2$ and $-B_2$ of opposite and approximately equal value which are substantially balanced with respect to each other.

When a negative triggering pulse appears at the output 38 of the threshold circuit 16, the N-P-N transistor 40 is cut off and, in turn, cuts off the transistor 42. The $x$ output goes positive and is clamped to a positive voltage equal to the voltage of the source $B_1$ by a clamping diode 44 connected by the $x$ output and the source of operating voltage $+B_1$. The $y$ output similarly goes negative and is clamped to the voltage equal to the source $-B_1$ voltage by a clamping diode 46, which is connected between the $y$ output and the source $-B_1$. Accordingly, the output voltage in the $x$ and the $y$ outputs of the pulse generators will be bi-polar and complementary. The negative output from the collector of the transistor 42 is coupled to the base of the other transistor 40 through a capacitor 48. This capacitor 48 prevents the base of the transistor 40 from becoming positive under the influence of the voltage from the source of operating potential $+B_1$ for a given period of time determined by the time constant of the circuit associated with capacitor 48. At the end of this given period of time, the transistors 40 and 42 return to their saturated quiescent states.

A diode 50 decouples the threshold circuit 16 from the pulse generating circuit 18 for the duration of the output pulse from the pulse generating circuit, since it is reverse biased by the negative voltage transmitted through the coupling capacitor 48 while the output pulse persists. This diode 50 is normally forward biased from the source of operating potential $+B_1$ through a resistor 52. Another diode 54 is connected to the base of the transistor 42. This diode is forward biased from the source of operating voltage $-B_1$ through a resistor 56. This forward biased diode 54 compensates for the voltage drop from collector to base of the transistor 42 during quiescent operation and makes the $y$ output of the pulse generating circuit 18 almost zero volts rather than a few tenths of a volt positive.

The pulse generating circuit 18 is a monostable multivibrator or one-shot circuit since it generates a single pulse for each triggering pulse. The pulse generating circuit is also generally useful as a pulse amplifier. The coupling capacitor 48 may be eliminated and pulses may be applied to the base of the transistor 40. The circuit will then provide bipolar output pulses in response to negative input pulses. A pulse amplifier circuit, such as shown in FIG. 6, may be used in digital circuits in those cases where signals representing a bit and its complement are desired.

The refractory circuit 20 prevents the neuron from firing for the duration of the output pulse. This refractory circuit includes a diode 58 and a resistor 60 connected between the negative, $y$ output of the pulse generating circuit 18 and the control electrode of the unijunction transistor 34. When the neuron fires, the negative output pulse will be transmited by the diode 58 and hold the control electrode at a negative level for the duration of the output pulse. The refractory circuit 20 prevents the integrating circuit 14 from charging to a level which would cause the threshold circuit 16 to fire. Accordingly, the firing rate of the threshold circuit 16 cannot be greater than the firing rate of the pulse generating circuit 18. The refractory circuit thereby insures that the output pulse rate and the threshold circuit 16 firing rate correspond.

When the unijunction transistor 34 fires, the impedance between the control electrode and the lower one of the output electrodes (the one connected to the capacitor 32) drops to a very low value. Accordingly, the capacitor 32 discharges when the threshold circuit 16 fires. The period of time for the integration circuit 14 to charge to the threshold potential after discharging is a function of the amplitude of the input signals or the input pulse rate. Thus, the output pulse rate of the neuron is a measure of how much the input signal amplitude or input pulse rate exceeds the threshold. This is a non-linear function, as shown in FIGS. 3 to 5, because of the non-linear rate of charging of the integration circuit 14.

Figure 8:
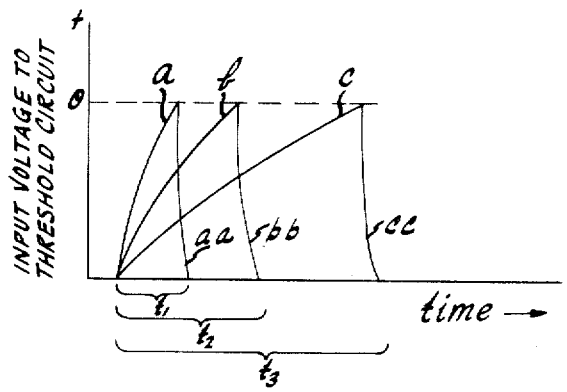
FIG. 8 is a family of curves which illustrates the input characteristics of the neuron circuit shown in FIGS. 7 and 8.

FIG. 8 illustrates the relationship between the time of charging of the integration circuit 14 and the amplitude of the input signal applied thereto. Curve "$a$" represents a short charging time $t_1$ when a large amplitude input signal is applied to the integration circuit. Curves "$b$" and "$c$" represent input signals of successively lower magnitude. When the threshold is reached, the integrating circuit discharges rapidly as shown by the steep descending portions $aa$, $bb$, $cc$, respectively, of each of the curves $a$, $b$, and $c$. A neuron having a threshold circuit which is discharged upon charging to the threshold level is especially suitable for use in receptor neurons which respond to analog signals. Such signals may be derived in response to any event to be analyzed such as a tone, a speech pattern, light pattern, or the like. Since the integration circuit discharges rapidly when the analog input signal reaches threshold level, the integration circuit can charge again to the new level of the input signal and thereby accurately follow variations in the level of the analog signal.

Other neurons, termed logic or pulse neurons, are especially suitable for logically processing information which may be in the form of pulse trains from other neurons, such as other receptor neurons. In such logic neurons it is desirable to provide continuous firing so long as the input signal pulse rate or amplitude is above the threshold. A circuit for a logic neuron will be described hereinafter in connection with FIG. 9 of the drawing.

Figure 7:
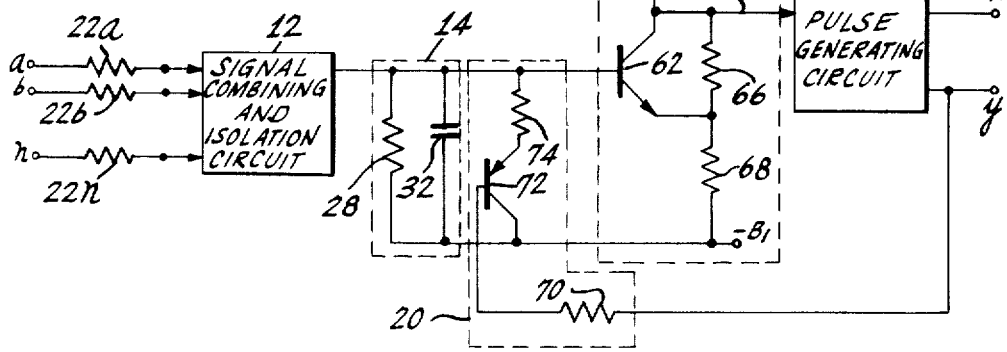
FIG. 7 is a partially schematic, partially block diagram of another neuron of the type shown in FIG. 1.

Another neuron circuit is shown in FIG. 7. This circuit may have a plurality of inputs $a$ to $n$ which are connected thereto through weighting resistors 22$a$ to 22$n$. Where circuits and components of FIG. 7 are similar to the circuit component in FIG. 6, like reference numerals are used in FIG. 7. A signal combining and isloation circuit 12 similar to the one shown in FIG. 6 responds to the inputs $a$ to $n$. This circuit 12 is connected to integration circuit 14 including a resistor 28 and a capacitor 32. The threshold circuit 16 includes an N-P-N transistor 62. This transistor is normally biased to cut-off by a source of operating voltage $-B_1$. The threshold level of the transistor 62 is set by a voltage divider including three resistors 64, 66 and 68 which are connected in series between the sources of operating voltage $+B_1$ and $-B_1$. The emitter voltage established by this voltage divider determines the threshold of the circuit 16. The output 38 of the threshold circuit 16 is a negative pulse generated when the transistor 62 is turned on in response to a positive base voltage greater than the threshold level. This negative pulse triggers the pulse generating circuit 18. The $y$ output is connected to the refractory circuit 20, including a resistor 70 which connects the $y$ output to the base of a P-N-P transistor 72. The emitter to collector path of this transistor 72 is connected through a resistor 74 across the capacitor 32 in the integrating circuit 14. The transistor 72 is normally non-conductive, since the base is quiescently at zero volts. Upon firing of a neuron, a negative pulse is applied to the base of the transistor 72. The transistor 72 conducts heavily thereby discharging the capacitor 32. Accordingly, the refractory circuit prevents the integrating circuit from charging to threshold potential for the duration of an output pulse from the neuron. The impedance presented by the transistor 72 may be varied by varying the value of the resistor 74. Accordingly, the integrating circuit may be discharged by varying amounts, depending upon the value of that resistor 74. The characteristics of the neuron shown in FIG. 7 are similar to the characteristics of the neuron shown in FIG. 6. However, the circuit of FIG. 7 is somewhat less expensive, since it permits the use of two presently relatively inexpensive transistors of the usual type instead of a presently relatively expensive unijunction transistor.

Figure 9:
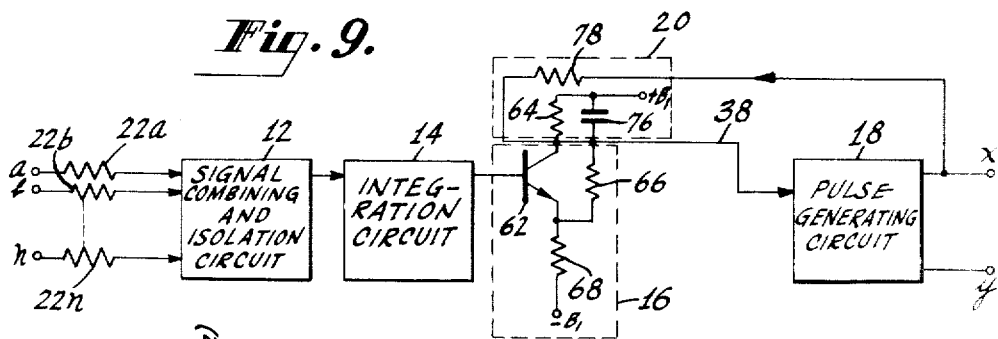
FIG. 9 is a partially block, partially schematic diagram of still another neuron of the type shown in FIG. 1.

Referring to FIG. 9 there is shown another circuit neuron. Parts of the neuron of FIG. 9 which are similar to parts of the neuron of FIG. 6 are designated by like reference numerals. The neuron of FIG. 9 may have a number of inputs $a$ to $n$ which are connected to a signal combining and isolating circuit 12 through weighting resistors 22$a$ to 22$n$. The combined signals are applied to an integrating circuit 14 and thence to a threshold circuit 16. The threshold circuit 16 of FIG. 9 is similar to the threshold circuit of FIG. 7 in that it includes an N-P-N transistor 62 and a threshold setting voltage divider including resistors 64, 66 and 68. This circuit establishes a quiescent threshold $\theta_q$ at the emitter. The output 38 of the threshold circuit 16 triggers a pulse generating circuit 18. The positive output ($x$) of the pulse generating circuit is fed back through the refractory circuit 20 to the threshold circuit 16. This refractory circuit includes a capacitor 76 which is connected across one of the voltage divider resistors 64 and a resistor 78 which is connected between the collector of the transistor 62 and the resistor 78.

When the neuron fires, the transistor 62 conducts heavily and the current through the emitter resistor 68 of the voltage divider increases. The voltage $V_e$ at the emitter of the transistor 62 increases (see FIG. 10). After a short interval (illustrated by the step in FIG. 10), the pulse generating circuit generates a pulse which is fed back through the resistors 78 and 64 and the collector to emitter path of the transistor to the emitter resistor 64. The voltage at the emitter thereby again increases. The fed back output pulse and the increased voltage across the resistor 68 due to conduction through the transistor 62 add together and raise the threshold level of the threshold circuit 16 for the duration of the positive output pulse. The duration of the pulse is labeled in FIG. 10 as $t_{pulses}$. A positive voltage appears at the terminal of the capacitor 76 which is connected to the collector of the transistor 62. The capacitor charges to this positive voltage. After the end of the output pulse, the capacitor discharges. The trailing edge of the curve in FIG. 10 results from the discharge of the capacitor. The voltage across the capacitor also appears at the emitter of the transistor 62 and causes the threshold to be raised above the threshold $\theta_q$ for a period of time after the pulse subsides. This period of time can be adjusted by adjusting the value of the capacitor 76 and/or of the resistors connected thereto.

Since the integrating circuit 14 is not discharged, the transistor 62 in the threshold circuit 16 will continue to fire, if the signal level in the output of the integrating circuit remains above the threshold $\theta_q$. However, since the threshold level is raised after each firing and returns to its original value $\theta_q$ slowly over a period of time, the intervals between successive firings will depend upon how much the input signal exceeds the threshold $\theta_q$. For example, if the input signal amplitude is slightly greater than the threshold amplitude $\theta_q$ the output will be a single pulse since the threshold circuit will not fire again until the capacitor discharges almost entirely. When the input signal amplitude is increased, a second pulse will follow the first pulse before the threshold returns to $\theta_q$ (before the capacitor 76 discharges). If the input signal amplitude is still higher, the threshold will still be exceeded immediately after the termination of the first output pulse. Accordingly, the output pulses will be still closer together. The pulse rate is, therefore, a function of the extent by which the input signal amplitude exceeds the threshold $\theta_q$.

Pulses will be generated so long as the input signal exceeds the threshold $\theta_q$. The rate at which these pulses are generated depends upon how much the threshold is exceeded. The pulses will stop as soon as the input signal amplitude drops below the threshold. The non-linear input-output characteristics illustrated in FIGS. 3 to 5 are therefore obtained with the logic neuron shown in FIG. 9.

Neural logic networks

Figure 11:
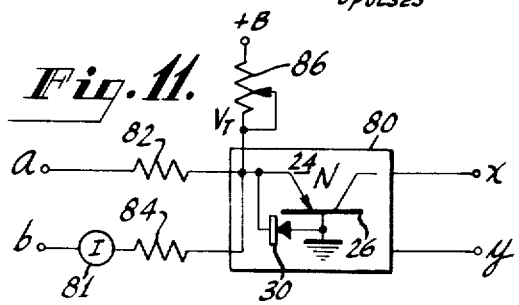
FIG. 11 is a partially block, partially schematic diagram of a neural network which responds to differences between excitatory and inhibitory inputs.

Referring to FIG. 11 there is shown a network for performing the logical function of determining inequality between two input signals. In the drawing, one input signal may be applied to the input $a$ of positive pulses and the other input may be applied to the signal input $b$. Both inputs $a$ and $b$ may be positive signals. An inverter circuit 81 is connected to input $b$ so as to invert the polarity of the signals applied to that input. This inverter may be an amplifier circuit of a type known in the art. When the input $b$ signal is obtained from the $y$ output of another neuron, the inverter 81 may be dispersed with. The network of FIG. 11 includes a neuron circuit 80 which may be of the type described above. This neuron circuit 80 includes a signal combining and isolating circuit having a common base transistor amplifier 26. The signal inputs $a$ and $b$ are applied, respectively, through weighting resistors 82 and 84 to the neuron circuit 80 by connection to the emitter of the transistor 24. Another input to the neuron circuit 80 is an adjustable input voltage designated in the drawing as $V_T$. The effective threshold $Q_\theta$ is the built-in threshold $\theta$ less $V_T$. This input $V_T$ is obtained from a source of positive voltage +B and through a variable resistor 86.

The outputs $x$ and $y$ of the network of FIG. 11 provide an answer to the question: Is signal input $a$, minus the effective threshold amplitude $Q_\theta$, greater than inhibitory signal input $b$? A pulse output will be obtained at the outputs $x$ and $y$, if the answer to this question is yes. When the neuron circuit 80 fires, the firing rate of the output pulses at the outputs $x$ or $y$ is a measure of how much $(a-Q_\theta)$ exceeds $b$.

The voltage input $V_T$ is selected empirically to insure that the negative inhibitory input signals are transmitted by a common base transistor amplifier 24 to the integration circuit of the neuron 80 with an inhibition effect equal to the excitation effect of excitatory signals of corresponding magnitude. The voltage input $V_T$ is a positive voltage which biases the emitter of the transistor 26 in the forward direction to a point approximately mid-way along the load line of the amplifier circuit 24 in the active region of its operating characteristics. Accordingly, the transistor 26 will have a large dynamic range of operation which is approximately equal for excitatory and inhibitory signals. The threshold $Q_\theta$ is a function of the voltage $V_T$ and of the threshold level $\theta$ set by the threshold circuit 16 (FIG. 1). By proper selection of the value of $V_T$ the effective threshold $Q_\theta = (\theta - V_T)$ can be adjusted by changing $V_T$ so that small differences between the excitatory input $a$ and the inhibitory input $b$ can cause the neuron 80 to fire.

Figure 12:
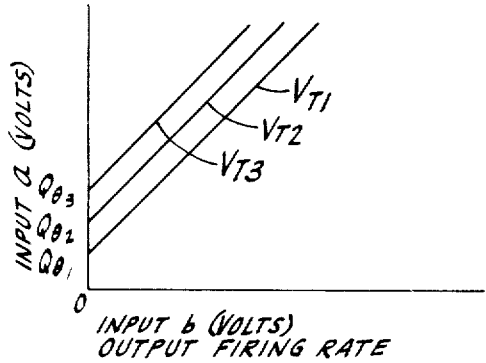
FIG. 12 illustrates a family of curves illustrating the operation of the network shown in FIG. 11.

FIG. 12 shows the characteristics of the inequality determining network of FIG. 11 having different magnitudes of input voltage $V_T$, namely $V_{T1}$, $V_{T2}$, and $V_{T3}$ which are respectively, of successively lower voltage.

Three curves $V_{T1}$, $V_{T2}$, $V_{T3}$ define the ranges of excitatory input signal $a$ and the inhibitory input signal $b$ in which the neuron 80 fires. The neuron 80 fires, when the intersection of a horizontal line and a vertical line drawn, respectively, from the ordinate and abscissa of the characteristic lies above the one of line $V_{T1}$, $V_{T2}$, or $V_{T3}$ corresponding to the magnitude of the input voltage $T_T$ which is applied to the neuron 80. The altitude of the point of intersection over the corresponding line $V_{T1}$, $V_{T2}$, or $V_{T3}$ is a measure of the firing rate of the neuron 80. The effective thresholds $Q_{\theta 1}$, $Q_{\theta 2}$, and $Q_{\theta 3}$ corresponding, respective to $V_{T1}$, $V_{T2}$, and $V_{T3}$ are shown on the ordinate of the characteristic of FIG. 12. FIG. 12 shows that the minimum difference between input $a$ and input $b$ which will cause the neuron to fire decreases with increasing input voltage $V_T$. Thus, a relatively smaller magnitude input $a$ fires the neuron 80 when $V_T$ equals $V_{T1}$ and a relatively larger magnitude input $a$ fires the neuron 80 when $V_T$ equals $V_{T3}$.

The relative effect on the neuron 80 of different input signals, either excitatory or inhibitory, may be selected by the use of appropriate weighting resistors, such as the resistors 82 and 84. The considerations which mediate the choice of the resistor values of the weighting resistors 82 and 84 are generally applicable to neural networks and systems to be described hereinafter. These considerations are discussed in connection with the inequality determination neural network of FIG. 11 solely in the interest of illustration of the principles involved.

The range of values of the weighting resistors is established by circuit considerations involved in coupling of successive neurons to each other. The weighting resistors should be of low enough resistance not to attenuate the input signals so that the input signal magnitudes are in the range of thermal drift currents in the transistors comprising the neuron circuits. This prevents sporadic firing of the neuron depending upon the ambient temperatures. The weighting resistors, however, must not be of such small resistance values as to cause overload of the output of a neuron circuit. When one neuron must drive a plurality of other neurons, called "fanout," the weighting resistances should be high enough to prevent overloading the output of the driving neuron despite the effective connection of several weighting resistors in parallel. It has been found that weighting resistors of between 10 kilohms and 500 kiloms are suitable and satisfy the logic and coupling requirements of the neural networks.

The choice of specific values for the weighting resistors within the suitable operating range of resistance values may be empirical. A minimum output firing rate from a neuron which will be considered significant is selected. This selection takes into consideration sporadic firing due to the non-coincidence of excitatory and inhibitory inputs and cross-talk effects from other neurons. This pulse rate may, for example, be 50 pulses per second. A pulse generator providing input pulses of proper polarity at an expected pulse rate is coupled to the input of the neuron through calibrated variable resistors. The variable resistors are varied so that, with desired input pulse rates, the minimum significant output pulse rate is generated. In the case of the inequality determining network of FIG. 11, the weighting resistors 82 and 84 are desirably of equal resistance. Variable resistors may be used to derive the exact resistance value for the resistors 82 and 84 by trial.

Figure 13:
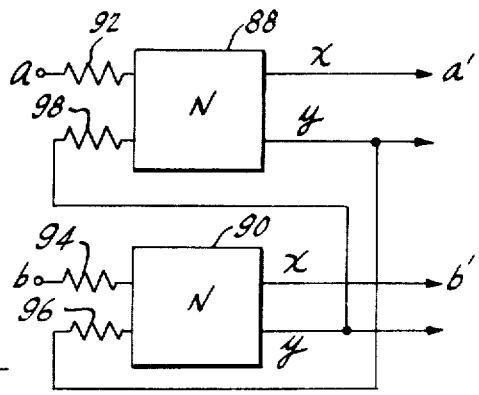
FIG. 13 is a partially block, partially schematic diagram of a neural network which enhances mutual differences between different inputs.

Referring to FIG. 13 there is shown a neural network for emphasizing or magnifying small, mutual differences between the amplitudes of two inputs. Outputs $a'$ and $b'$ corresponding to inputs $a$ and $b$, but having the differences therebetween much greater than the differences between $a$ and $b$, are provided by the network of FIG. 13. The network of FIG. 13 forms the logical function of mutual inhibition, that is, each neuron output $y$ inhibits the other such that the small differences between the input signals are magnified. The neural network of FIG. 13 is useful for enhancing the contrast between two events, such as two tones, two patterns or the like. This contrast enhancement may be used for feature abstraction where the significant feature to be examined is the difference or separation between two quantities.

The mutual inhibition network of FIG. 13 includes two neurons 88 and 90. Inputs $a$ and $b$, which are excitatory inputs, are separately applied to the neurons 88 and 90 through weighting resistors 92 and 94. The negative output $y$ of the neuron 88 is connected, as an inhibitory input, to the neuron 90 through a weighting resistor 96. Similarly, the $y$ output of the second neuron 90 is connected through a weighting resistor 98 to another input of the neuron 88. Thus, each neuron has a different excitatory signal input and an inhibitory input corresponding to the inhibitory output of the other neuron. The weighting resistors 96 and 98 in the inhibitory inputs are larger in value than the weighting resistors 92 and 94 in the excitatory inputs so as to prevent one neuron from completely inhibiting the other.

Figure 14:
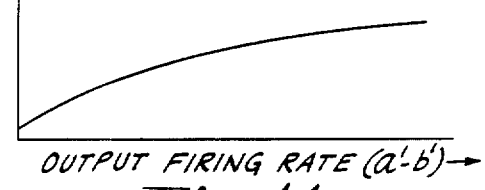
FIG. 14 illustrates a curve representing the input-output characteristics of the network shown in FIG. 13.

The operation of the mutual inhibition network is characterized in FIG. 14. The differences between input signal firing rate $(a-b)$ is reflected as a greater difference in the output firing rate $(a'-b')$.

For example, for input signal $a$ greater in magnitude than input signal $b$, the magnitude of the inhibitory input to the neuron 88 is represented as $-kb'$, where $k$ is a constant less than unity, due to attenuation of the $y$ (negative) output of the neuron 88 by the weighting resistor 98. Similarly, the magnitude of the inhibitory input to the other neuron 90 is represented by $-ka'$. The constant $k$ has the same value because the weighting resistors 96 and 98 are of equal resistance. The output of the neuron 88 is, therefor, proportional to $(a-kb')$ and the output of the other neuron 90 is proportional to $(b-ka')$. The difference of the outputs $a'$ and $b'$ is $$(a-b)+k(a'-b')$$

Thus, $(a'-b')$ is greater than $(a-b)$ by $k(a'-b')$.

A mutual inhibition network may be provided for more than two inputs by providing additional neurons for each input and by connecting the inhibitory outputs of certain ones of the neurons to the inputs of certain others thereof. For example, by connecting the inhibitory outputs of the neurons 88 and 90 to inputs of a third neuron together with a third excitatory input $c$, the difference between $c$ and the sum of $a$ and $b$ may be contrasted or enhanced.

Figure 15:
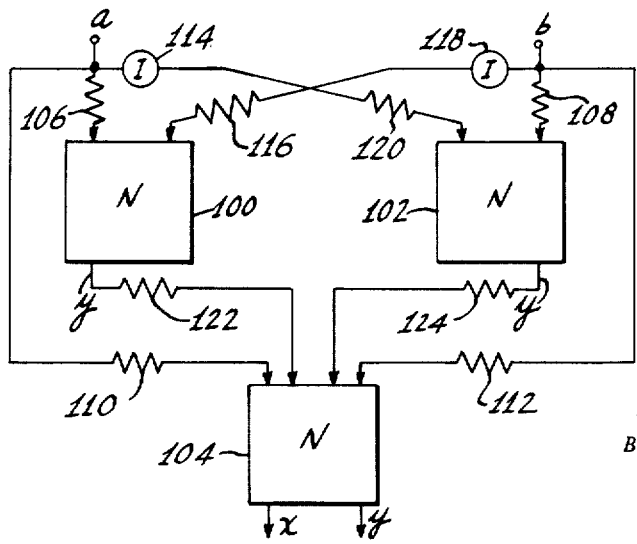
FIG. 15 is a partially schematic, partially block diagram of a neural network which performs the logical AND function.

In FIG. 15 there is shown a neural logic network which is analogous to digital networks which perform the AND function. Since input signals to neural networks have a range of values, merely combining inputs in a single neuron does not satisfy the logical AND function because an output from that single neuron might occur when only one large amplitude input signal is present. For the AND function, an output is desired so long as two inputs are present even though the amplitudes may be very small. Three of these neural networks 100, 102, and 104 are shown in FIG. 15. An excitatory input $a$ is applied through a weighting resistor 106 to the neuron 100. Another excitatory input $b$ is applied through a weighting resistor 108 to the second of these neurons 102. The inputs $a$ and $b$ are separately applied through weighting resistors 110 and 112 to the third neuron 104. The input $a$ is applied as an inhibitory input to the second neuron 102. A circuit which includes an inverter 114 and a weighting resistor 120 in series with the inverter, changes the polarity of the excitatory input and converts it into an inhibitory input. The inverter 114 may be an amplifier which provides output pulses opposite in polarity to the pulses applied to the input thereof. If an inhibitory output corresponding to the input $a$ is available, for example, from the $y$ output of the neuron which supplies the $a$ input, this inhibitory signal may be applied directly through the weighting resistor 120 to the input of the neuron 102. The $b$ input is applied as an inhibitory input to the first neuron 100. Another inverter 118, similar to the inverter 114 in series with a weighting resistor 116, may be used. If, another neuron output supplies the $b$ input, its $y$ output may be used and the inverter 118 dispersed with. The inhibitory outputs $y$ of the neurons 100 and 102 are applied through separate weighting resistors 122 and 124 to other inputs of the third neuron 104. Accordingly, there are two excitatory inputs to the neuron 104 and two inhibitory inputs thereto. The weighting resistors 122 and 124 are of lower resistance value than the weighting resistors 110 and 112 in the excitatory inputs to the neuron 104. The weighting resistors 116 and 120 in the inhibitory inputs to the neurons 100 and 102 are also of lower values of resistance than the weighting resistors 106 and 108 in the excitatory inputs of these neurons. The resistance values of these resistors are set forth in the following tabulation. It will be appreciated that these values are solely for purposes of illustration.

Resistor 106—100 kilohms
Resistor 108—100 kilohms
Resistor 110—100 kilohms
Resistor 112—100 kilohms
Resistor 116—50 kilohms
Resistor 120—50 kilohms
Resistor 122—90 kilohms
and
Resistor 124—90 kilohms In operation, so long as inputs $a$ and $b$ are present and greater than the threshold $\theta$, the neurons 100, 102, and 104, fire and provide outputs $x$ and $y$. Assuming that inputs $a$ and $b$ are present, both neurons 100 and 102 are heavily inhibited, since the excitatory signals are attenuated more than the inhibitory signals because the resistors 106 and 108 are of greater value than the resistors 116 and 120. The sum of the inputs to the neuron 104 is heavily excitatory because of the inhibition of the neurons 100 and 102. Thus, the neuron 104 fires indicating that the AND function is satisfied.

If one of the inputs, for example input $a$, is of much greater magnitude than the other input $b$, only the neuron 100 may fire. The inhibitory input to the neuron 104 from the neuron 100 through the weighting resistor 122 is, however, attenuated below the sum of the excitatory inputs to the neuron 104 through the resistors 110 and 112. Accordingly, the excitatory inputs to the neuron 104 are greater than the inhibitory input thereto and the neuron 104 fires thereby satisfying the AND function.

The neuron 104 does not fire, if one and only one of the inputs $a$ and $b$ is present, regardless of the strength of that input. For example, if input $a$ alone is present, only the neuron 100 fires. However, the inhibitory input to the neuron 104 is relatively less attenuated by the weighting resistor 122, and the excitatory input to the neuron 104 is relatively more attenuated by the resistor 110. Accordingly, the neuron 104 will be inhibited from firing.

The pulse rate of the output of the neuron 104 will also be a function of the amount by which the sum of the inputs $a$ and $b$ exceeds the threshold for firing $\theta$. The digital AND function as well as an analog AND function are therefore both provided by the network of FIG. 15.

Figure 16:
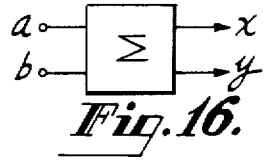
FIG. 16 is a block diagram of a symbol representing the neural network of FIG. 15.

The symbol for the summation network of FIG. 15 is shown in FIG. 16. This symbol is a block similar to the general neuron symbol having inputs $a$ and $b$ and inhibitory outputs $x$ and $y$. The block is inscribed with the Greek letter $\Sigma$.

Certain biological neurons are known to respond only to changes in excitation. Still other biological neurons have a response which accommodates for changes in excitation. A response to the initiation of excitation is referred to as the ON response and the response to the cessation of stimulation is referred to as the OFF response. The ON response is usually a pulse train comprising an initial burst of pulses that occurs at the onset of an input signal, followed by a diminishing pulse rate which eventually ceases altogether. The OFF response is also a pulse train. The repetition rate of the pulses in the latter train is a measure of how long ago the cessation of the input signal ocurred.

Figure 17:
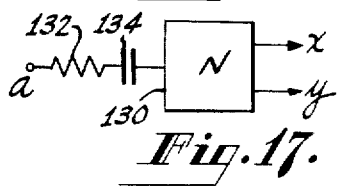
FIG. 17 is a partially schematic, partially block diagram of a neural network which responds to the onset of an input.

A neural network which provides the ON response is shown in FIG. 17. Neural networks which provide the OFF response and a response which accommodates to changes in input signals are shown, respectively, in FIGS. 20 and 23.

Referring first to FIG. 17, there is shown an electrical circuit neuron 130 which may be of the type described in connection with FIG. 1 of the drawing. An excitatory input signal $a$ is connected to the input of the neuron 130 through a charging circuit including a resistor 132 and a capacitor 134. The operation of the network will be more apparent from FIG. 18. It is assumed that a train of excitatory impulses (positive pulses) 136 from a preceding neuron is applied to the input $a$. An analog signal rather than a train of impulses may be applied to the input. The capacitor 134 charges in response to the input signal at a rate determined by the time constant of the charging circuit. A suitable time constant may be provided if the capacitor 134 has a value of capacitance of 20,000 $\mu\mu f$. and the resistor 132 has a resistance of 100 kilohms. The time constant of the charging circuit is such that the capacitor charges quickly to a maximum value in accordance with the amplitude of the input pulses 136. The capacitor remains charged for the duration of the pulse train and then discharges into the input of the neuron. Thus the current rises rapidly and falls exponentially as shown in waveform 138. At the end of the train of pulses, another burst of current in the reverse direction occurs due to the transient when the capacitor discharges. The $x$ (positive) output of the neuron 130 in response to the input current 138 is shown in the waveform 140. As soon as the threshold is exceeded, the neuron delivers a burst of pulses. The firing rate of the neuron increases as the input current increases and decreases as the input current decreases. The negative current at the end of the pulse train 136 has an inhibitory effect and does not cause the generation of any more pulses. Accordingly, the ON response of the neural network is an initial burst of pulses that occurs at the onset of the input signal followed by a diminishing pulse rate. The ON response of the network of FIG. 17 is closely similar to the ON response of biological neural networks. The symbol for a neural network which produces an ON response is shown in FIG. 19 as a block which is inscribed with the symbol $N_{ON}$.

Referring to FIG. 20, there is shown the neural-network for producing the OFF response. This network includes a neuron 142 of the type shown in FIG. 1. An excitatory input signal to the neuron is applied by way of an inverter 144, which inverts the signal into an inhibitory signal, a resistor 146 and a capacitor 148. The resistor and capacitor 146 and 148 constitutes a charging circuit. Suitable values of resistance and capacitance may be 20,000 $\mu\mu f$. for the capacitor 148 and 100 kilohms for the resistor 146. If an inhibitory input is available from the output of a preceding neuron circuit, the inverter 144 may be eliminated and the inhibitory input connected directly to the charging circuit.

Assuming that a train of negative pulses 150, as shown in FIG. 21, is applied to the charging circuit. The capacitor 148 charges rapidly to a maximum negative amplitude. The current into the input of the neuron 142, as shown by waveform 152, diminishes and ceases altogether at the end of the pulse train. A transient positive current due to the discharge of the capacitor 148 occurs after the end of the pulse train. The neuron responds only to this positive transient current and generates a train of output pulses. The pulses which are generated at the $x$ output are shown in waveform 154. The firing rate of the neuron increases to a maximum determined by the maximum amplitude of the positive current at the input of the neuron 142, and then diminishes. The peak amplitude of the input current is determined by the time constant of the charging circuit at the input of the neuron 142. A relatively long pulse train will cause the capacitor to charge to a higher voltage than a relatively short pulse train. The output pulse rate is a function of the voltage to which the capacitor 148 charges. Thus, the duration or rate of the input pulse train is related to the output pulse rate. If the duration of the input pulse train is much greater than the time constant of the charging circuit, the output pulse rate is a measure of the duration of the input pulse train. If the duration of the input pulse train is the same order as the time constant of the charging network, the output pulse rate is related to both the duration of the input pulse train and the repetition rate of the pulses therein.

The symbol for the OFF response network is shown in FIG. 22 as a block inscribed with the symbol $N_{OFF}$.

Accommodation in a neural network to a change in a stimulus is a phenomenon exhibited as a change in the pulse rate at the output of the neural network. The pulse rate decreases with time although the input stimulation is maintained constant. Accommodation also affects the threshold at which the neural network fires. For example, when excitatory stimulation increases in magnitude and remains at such increased magnitude for a long period of time, the threshold of the neuron increases so that the neuron responds only to such later stimulation as is greater in intensity than the ambient or existing stimulation of the neuron. However, the response of the neuron still indicates that the earlier, continuing stimulation is present. In other words, the neuron performs the logical function of recognizing the presence of ambient excitation and changes therein.

The accommodoation neural network of FIG. 23 includes a neuron 156 of the type disclosed in connection with FIG. 1. An excitatory input to this neuron passes through a parallel R-C charging circuit including a capacitor 158 and a resistor 160. Suitable values of resistance and capacitance are 500 kilohms for the resistor 160 and 20,000 $\mu\mu f$. for the capacitor 158.

The input signal which is applied to the input $a$ of the network may be a train of pulses, such as illustrated by the waveform 162 of FIG. 24. This waveform includes pulses which are of a relatively fast repetition rate followed by pulses which are of a relatively slow repetition rate. It will be appreciated that analog signals which vary between relatively high and relatively low levels of amplitude may also be applied to the input $a$.

The relatively short time constant of the charging circuit allows a short burst of current as the capacitor 158 charges. This current diminishes to a steady state current of amplitude determined by the amplitude of the pulses in the first part of the pulse train 162. When the second part of the pulse train occurs and pulses begin arriving at a much slower rate, the capacitor discharges to a negative voltage or a voltage negative with respect to the threshold, and then recharges to a voltage determined by the magnitude of the slower pulses and their repetition rate (i.e. the D.C. value of the slower pulses). The $x$ output of the neuron is shown in waveform 166 of FIG. 24. When pulses of faster repetition rate occur, the neuron 156 responds by firing rapidly at the onset of the pulse in response to the positive portion of the current. Thereafter, while the faster pulses persist, the neuron fires at a somewhat slower but steady rate. With the onset of slower repetition rate pulses, the neuron 156 is first inhibited from firing, and then resumes firing at a much slower rate than was initially the case. Thus, a gap in the output of the network or a burst of firing from the network indicates a change in the input signal thereto. The network, however, responds by a steady firing rate to indicate that the input signal is present. This steady rate also indicates the magnitude of the input signal. In other words, the neural network of FIG. 23 functions logically by providing outputs indicative of the presence of information, and also changes in such present information.

Another logical function which is possible with biological neurons is priority response. These biological neurons function logically to determine that two inputs have occurred and that a specified one of these preceded the other. A neural network which performs the priority function is shown in FIG. 25. Two inputs $a$ and $b$, may be applied to the priority neural network. This network produces excitatory $x$ outputs and inhibitory $y$ outputs in response to the occurrence of two inputs, $a$ and $b$, within a certain period of time, if and only if, $a$ precedes $b$. The period is determined by the time constant of the integrating circuit of the neuron (FIG. 1). The priority network includes two neurons 170 and 172 each of the type discussed in connection with FIG. 1. The excitatory inputs $a$ and $b$ are connected to the first of these neurons 170, separately, through weighting resistors 174 and 176. The excitatory input $b$ is also connected to the neuron 172 through another weighting resistor 178. The weighting resistors 174, 176 are desirably of equal resistance. The resistor 178 is of somewhat lower resistance than the resistors 174 or 176. The inhibitory $y$ output of the neuron 172 is fed back through a weighting resistor 180 to the input of the first neuron 170. The weighting resistor 180 is of less weight (lower resistance value) than resistors 174 and 176. The threshold of neuron 170 is set so that either input $a$ or $b$, alone is insufficient to fire it.

In operation, if both inputs $a$ and $b$ occur simultaneously, the first neuron 170 will be inhibited, since the inhibition input to the neuron 170 is of greater magnitude than both excitatory inputs $a$ and $b$ because of the relatively low resistance weighting resistor 180. If input $b$ occurs within the given time period, but before input $a$, the second neuron 172 inhibits the first neuron 170 so that the input $a$ does not excite the neuron 170 to provide an output. It is only when the input $a$ occurs before the input $b$ that the neuron 170 is not inhibited and the output is provided. Accordingly, the neural network of FIG. 25 functions logically to determine priority of two inputs. By using additional neurons having additional inhibitory feed back connections to the first neuron, the priority of one among several inputs may be determined.

A symbol for the priority neural network is shown in FIG. 26 as a block inscribed with the letters $N_P$ and the symbol a:b to indicate that the neuron responds to the priority of $a$ with respect to $b$ within a given time period.

*Neural systems*

The neural networks described in connection with FIGS. 11 through 26 may be interconnected in systems which respond to complex patterns of events. These events may be sound patterns, such as the amplitude-frequency spectrum which are representative of various phonemes. Other events may be light patterns such as are produced when light is transmitted through or reflected from symbols, letters of the alphabet and the like. Neural systems may be used to abstract significant features of complex patterns or to recognize certain patterns.

Systems of neural networks may also be generally useful for information processing. Complex analog functions may be translated into simplified form by neural systems which find the maxima, minima, slopes and other relationship of these complex functions. Other systems of neural networks are useful in performing arithmetical operations on information, for example neural systems for multiplication, addition, subtraction and the like.

FIGS. 27a and 27b show a system of neural networks which is suitable for analyzing analog information, and particularly for pattern recognition of a pattern representing a speech sound, such as a phoneme. The upper portion of FIG. 27a shows two curves 186 and 188 which, respectively, represent the instantaneous frequency spectrum of a sound at successive times, $t_1$ and $t_2$. Different electrical currents correspond to the intensities of the sound at different frequencies $a$, $b$, $c$, $d$, and $e$ and may be applied as inputs to the system by means of signal translating devices, e.g. microphones and amplifiers, such as are known in the art. These devices may include microphone amplifiers and band pass filters. Since such electrical translations are known in the art, they are not shown in detail in the drawings.

The signal currents are applied as input signals $a$, $b$, $c$, $d$, and $e$ through weighting resistors 202 to receptor neuron circuits 190, 192, 194, 196 and 198, respectively, which are interconnected as mutual inhibition neural networks similar to the network shown in FIG. 13. The receptor neurons 190, 192, 194, 196, and 198 comprise a primary level of neurons 199. FIGS. 27a and 27b are partially fragmentary. Additional inputs and neuron stages preceding input $a$ and neuron 190 and succeeding input $e$ and neuron 198 may be desirable. The inhibitory output $y$ of each receptor neuron 190, 192, 194, 196 and 198 is fed back as an inhibitory input to its two adjacent neurons through separate weighting resistors 200. The first and last of the receptor neurons (not shown) receive inhibitory outputs of their adjacent receptor neurons on the right and left, respectively. The relative weights or resistances of each of the weighting resistors 200 and 202 may be the same as disclosed in connection with FIG. 13.

The excitatory outputs and the inhibitory outputs $y$ are, respectively, applied through weighting resistors 204 and 208 to the inputs of neurons in a second level 206 of neurons which determine the differences between adjacent ones of the input signals $a$, $b$, $c$, $d$ and $e$. Since the neurons in the primary level 199 of neurons are mutually inhibited, small differences in the inputs $a$ to $e$ are enhanced. Thus, the second level 206 of neurons readily abstract information as to which of the adjacent pairs of inputs is greater than the other. The second level 206 utilizes neural networks 210, 212, 214, 216, 218, 220, 222, 224, 226 and 228 of the type described in connection with FIG. 11. The variable input $V_T$ in each of these networks 210 to 228 is not shown. However, the magnitude of $V_T$ may be equal in each of the networks and chosen as discussed in connection with FIG. 11. Since inhibitory inputs are applied through weighting resistors 208 to the networks 210 to 228, an inverter, such as shown in FIG. 11, is not necessary. The networks 210 to 228 provide outputs when the excitatory input exceeds the inhibitory input. Thus, the neuron 210 fires when input $a$ is greater than input $\psi$. Input $\psi$ is the input preceding the input $a$ in the frequency spectrum to which the system of FIG. 27 responds. This input $\psi$ to the network 210 may be derived from another receptor neuron (not shown). The operation of the network 210 is symbolized by the inscription $a > \psi$ in the block representing the network 210. The other neural networks 212 to 228 fire when their excitatory inputs exceed their inhibitory inputs. The input to the neural network 228 is derived from a receptor neuron (not shown) which responds to the next higher frequency input $b$.

Summation neural networks 230, 232, 234, 236 and 238 derive the maxima points of the pattern. These networks are of the type shown in FIG. 15. If the input $a$ corresponds to a maxima point of the pattern, the summation network 230 will fire. Similarly, the summation networks 232, 234, 236 and 238 will fire if the input signals $b$, $c$, $d$ and $e$, respectively, correspond to the maxima points of the pattern. These maxima points are significant features of the analog function to which the system responds. Accordingly, the networks 230 to 238 are feature abstracting networks.

The inputs to the network 230 are the $x$ (positive) outputs of the inequality determining networks 210 and 212 and are applied through weighting resistors 240 which may be of equal resistance value. Input $a$ corresponds to a maxima point of the function, if $a$ is greater than its preceding and succeeding inputs $\psi$ and $b$. The summation network 230 provides an output only if inputs representing $a>\psi$ and $a>b$ are applied thereto during the period set by the integrating time constant (temporal characteristic) of the neurons constituting the network 230. Accordingly, neuron 230 fires, if, and only if, input $a$ corresponds to a maxima point of the function. The neural networks 230, 232, 234, 236 and 238 receive their inputs through weighting resistors 242, 244, 246 and 248, respectively. Inputs are applied to the summation network 232 if, and only if, input $b$ is greater than its adjacent inputs $a$ and $c$. The neural network 234 receives its inputs from the excitatory outputs of the inequality determining networks 218 and 220. Since both of these networks do not fire unless $c$ is greater than its adjacent inputs $b$ and $d$, the summation network 234 fires if $c$ corresponds to a maxima point of the function. The summation networks 236 and 238 operate similarly to the networks 230, 232, and 234, and fire if, and only if, $d$ or $e$ correspond to maxima points of the function. The firing rates of the networks 230, 232, 234, 236 and 238 correspond to the relative height of the maxima.

Other important features of analog functions are their minima points. Such minima points may be obtained from appropriate ones of the inequality determining networks in the second level 206 of neurons. For example, input $b$ corresponds to a minima point, if its adjacent inputs $a$ and $c$ are both greater in magnitude than input $b$. Inputs $c$ and $d$ similarly correspond to minima points if their adjacent inputs $b$ and $d$ or $c$ and $e$ are, respectively, greater than $c$ and $d$ in magnitude. By way of example, the means for abstracting information as to whether $b$, $c$, or $d$ are minima points and the relative depth of the minima are shown in FIGS. 27a. It will be appreciated that similar means may be used to derive information as to whether minima points also correspond to the other inputs $a$ and $e$.

A summation network 250 fires when $b$ corresponds to a minima. This summation network derives its inputs through weighting resistors 252 from the output of the inequality determining networks 212 and 218. The network 212 fires, if input $a$ is greater than input $b$ and the network 218 fires, if input $c$ is greater than input $b$. The summation network 250 will fire if, and only if, both inequality determining networks 212 and 218 fire within the temporal characteristics of the network 250. Accordingly, the summation network 250 provides an output if $b$ is less in magnitude than its adjacent inputs $a$ and $c$. The rate of firing of the network 250 is a function of the relative depth of the minimum point.

Summation networks 255 and 254 which, respectively, respond to inputs from the inequality determining networks 216, 222 and 200, 226 through weighting resistors 253 and 256 operate similarly to the summation network 250 for providing outputs if, and only if, input $c$ or $d$ corresponds to a minimum point of the function.

Another significant feature of an analog function is the slope of different regions thereof. The slope of the speech pattern can either be negative (decreasing amplitude with increasing frequency) or positive (increasing amplitude with increasing frequency). The slope of the function is positive if successive adjacent inputs are of increasing amplitude and negative if these successive adjacent inputs are of decreasing amplitude. For example, if inputs $a$, $b$, and $c$ are of successively decreasing amplitude, the slope of the function is negative, and if these inputs are of successively larger amplitude the slope is positive. By way of example, means are shown in FIG. 27a for recognizing a negative slope of the region of the function included by the inputs $a$, $b$, and $c$ and for obtaining an output indicative of a positive slope in the part of the function included by the inputs $c$, $d$, and $e$.

A summation network 258 responds to the slope of the region of the function embraced by the input signals $a$, $b$ and $e$. Inputs to this summation network are obtained through the weighting resistors 252 and 253, which may be of equal value, from the inequality determining networks 212 and 216. The latter networks both fire, if input $a$ is greater than input $b$ and if input $b$ is greater than input $c$. Both excitatory inputs to the network 258 occur only if the inputs $a$, $b$, and $c$ are of successively smaller amplitude indicative of a negative slope in the region of the function embraced by inputs $a$, $b$, and $c$. The firing rate of the network 258 is a function of the relative steepness of the slope.

Another summation network 260 provides an output when the slope of the portion of the function included by the inputs $c$, $d$, and $e$ is positive. Inputs to this summation network 260 are obtained through weighting resistors 253 and 256, which are of equal resistance, from the inequality determining networks 222 and 226. The network 222 fires, if input $d$ is greater than input $c$ and the network 226 fires if input $e$ is greater than input $d$. Outputs from both networks 222 and 226 occur, approximately simultaneously, only if the inputs $c$, $d$, and $e$ are of successively greater amplitude. Accordingly, the summation network 260 will fire if, and only if, a positive slope exists in the region of the curve included by the inputs $c$, $d$, and $e$. The rate of firing of the network 260 is a function of the relative steepness of the curve.

Another significant feature of analog signals is a shift of a local maxima, a local minima or a slope from one part of the function to another at successive time intervals. For phoneme recognition or for other pattern recognition purposes, such as shift may be characteristic of a particular sound. For example, the consonant sounds "b" as in "bead," "g" as in "good," may be distinguished by examining the patterns representing these sounds at successive time intervals. The sound "b" is characterized by a shift in local maxima to a higher frequency, whereas the sound "g" is characterized by a shift in local maxima to a lower frequency. Otherwise the formants (frequency-amplitude) spectra of these sounds are similar.

By way of example, means are provided in the system of FIG. 27a for obtaining an output when the local maxima shifts from around the frequency corresponding to input $b$ to around the frequency corresponding to input $d$ between successive time intervals $t_1$ and $t_2$. This circuit includes an OFF response network 262, the input of which is connected through a weighting resistor 264 to the $y$ output of the summation network 232. This network 232 fires when input $b$ is at a maximum point of the pattern. An ON response network 266 is connected through a weighting resistor 268 to the excitatory $x$ output of the summation network 236. The summation network 236 provides an output in response to a local maximum at a frequency which is about that of the $b$ input. A summation network 270 is connected through weighting resistors 272 which are suitably of equal resistance to the $x$ outputs of the OFF response network 262 and of the ON response network 266. The summation network 270 fires if, and only if, the maximum shifts from $b$ to $d$, since the OFF response network 262 fires when the $b$ input ceases and the ON response network 266 fires when the $d$ input is initiated.

It is important to obtain information as to which of two local maxima or local minima occurs first. By way of example, a means for determining whether a local maximum corresponding to input $b$ occurred before a local maximum corresponding to input $d$ is shown in FIG. 27b. This means comprises a priority determining network 274 which is connected through weighting resistors 276 to the $b$ maximum output and the $d$ maximum output which are, respectively, obtained from the summation network 232 and the summation network 236 (FIG. 27a). The priority network operates as explained above in connection with FIG. 25 and fires if, and only if, inputs $b$ and $d$ are both at maxima points and input $b$ occurs before input $d$. It is apparent from the curves 186 and 188 that the latter is the case. Accordingly, the priority network 274 will fire and provide a train of output pulses. It is noted that networks 270 and 274 will both fire in the illustrative case shown and discussed herein. However, different logical significance attaches to the outputs of these networks and these outputs may serve different purposes.

The significant features of the analog function which are abstracted by the neural system of FIG. 27a and FIG. 27b are the following:

*a* maximum; *a* minimum.
*b* maximum; *b* minimum.
*c* maximum; *c* minimum.
*d* maximum; *d* minimum.
*e* maximum; *d* minimum.
Slope *a*, *b*, *c*, negative.
Slope *c*, *d*, *e*, positive.
Local maxima transition from *b* to *d*, and local maxima priority, *b* before *d*.

These significant features are only illustrative and many more features may be abstracted by additional networks in combinations of networks of the types discussed above.

These features are associated with certain events such as certain patterns or in the case of phoneme recognition of specific phonemes. In order to recognize these phonemes response units are used, one for each phoneme. Two response units 280 and 282 are shown, by way of example, in FIG. 27b. Many more units may be used in practice. These units 280 and 282 include weighting networks 284 and 286, neuron circuits 288 and 290, and indicators or other utilization apparatus 292 and 294. The response units 280 and 282 respond to different combinations of features and reject other combinations. The other response units (not shown) may respond to still other, different combinations of features. These combinations of features are selected in accordance with the probability that these features will occur or be associated with the event to be recognized. For phoneme recognition the probabilities may be derived empirically by analysis of the features which are abstracted when the same phoneme is sounded.

The response unit 280 responds to certain features *a* maximum, *b* maximum, and *d* minimum. The inputs are excitatory, except for an inhibitory input corresponding to *e* maximum. The weighting network 284 includes weighting resistors 296, 298, 300, 302 and 304. These resistors have different values of resistance depending upon the relative value of the output representing the feature which is applied to the neuron 288 through that resistor. The choice of values of resistance for the case where a phoneme represented by the curve 186 is to be recognized is discussed herein for purposes of example. The neuron 288 has a threshold which is just exceeded, when the input signals thereto satisfy the pattern which is to be recognized by the response unit. It is highly improbable that another combination of input signals will have the same amplitude and cause the neuron 288 to fire. If such a probability exists, an inhibitory input is used as will be discussed hereinafter. In this particular case, taken for purposes of example, the curve 186 has a maximum amplitude around a point corresponding to input *b*. Accordingly, resistor 298 has the highest value of resistance of all of the other resistors in the weighting network 284. There is a minimum correspondence to the input *d*. However, this minimum does not have a depth which corresponds in amplitude to the height of the maxima at *b*. To equalize these differences, the weighting resistor 302 is of lower value of resistance than that of the weighting resistor 298. The other inputs 296 and 300 are inactive when a function corresponding to the curve 186 exists. However, statistical studies of the phoneme indicated that under some conditions, such as for different speakers, there will be a distribution of local maxima at *a* and *c* rather than at *b*. To accommodate for this probability and to recognize when the same phoneme is spoken by several speakers, additional inputs through weighting resistors 296 and 300 are provided. The values of these resistors may be equal so as to provide the same total excitatory input just exceeding the threshold of the neuron 288, as is the case when the phoneme corresponds more exactly to the function shown by curve 186. Statistical studies may reveal that other combinations of the inputs *a* maximum, *b* maximum, *c* maximum and *d* minimum not representing the disclosed phoneme might possibly fire the neuron 188. However, these combinations of inputs also include an input corresponding to a maximum point at *e*. The inhibitory output of the summation circuit 238 (FIG. 27a) is, therefore, connected through the weighting resistor 304 to the input of the neuron 288. However, this weighting resistor 304 has a value of resistance lower than any of the resistors 296, 298, 300 or 302. Accordingly, the *e* maximum input inhibits the neuron 288 from firing in response to an undesired phoneme.

The indicator 292 may be a light or it may be conversion apparatus which provides a sound corresponding to the recognizing phoneme, or types a word, letter or symbol for the sound.

The other response unit 282 is connected to recognize the phoneme represented by the curve 188. To this end, the neuron input is connected through weighting resistors 306, 308, 309, 318, 312 and 314 in the weighting network 286, to inputs corresponding to priority of *b* maximum prior to *d* maximum, *a* minimum, *b* maximum, *c* maximum, *d* maximum, and *e* minimum. The values of these resistors are adjusted to provide approximately equal inputs, the sum of which just exceeds the threshold of the neuron 290. The weighting resistor 306 which provides an inhibitory input from the network 274 to the neuron 290 is disregarded in choosing the values for the other weighting resistors. The greatest amplitude input is *d* maxima. Accordingly, the resistor 312 has the greatest value of resistance of all of the resistors, except the resistor 306 in the inhibitory connection. The values of the resistors 314 and 308 may be approximately equal since these minima are of about the same depth. The inputs through the resistors 309 and 310 correspond, respectively, to *b* maximum, and *c* maximum and are provided to accommodate for variations in speaking and/or different speakers. Although these inputs *b* maximum and *c* maximum do not occur when the pattern is represented by the curve 188 exists, they do occur in other patterns derived from the same phoneme. It is desirable to absolutely inhibit the neuron 290 if, for example, a function as represented by the curve 186 precedes the function represented by the curve 188. Accordingly, the priority circuit 274 supplies the inhibitory input to the response unit 282. The neuron 290 will be inhibited from firing, if a pattern having a maxima at *b* precedes a pattern having a maxima at *d*, as is apparently the case for the pattern represented by the curves 186 and 188. The indicator 294 responds to the firing of the neuron 290. This indicator may be the same as the indicator 292 or may be utilization apparatus such as converts the phoneme back into acoustic form.

It will be apparent that the neuron system performs both digital (yes-no) logic and analog logic simultaneously. Thus, quantitative or analog measures of digital functions is preserved. In this manner the system combines both analog and digital processes in a unique way.

*Simulated cochlea*

It is recognized that the human ear has capabilities for analyzing and recognizing spoken words which have not been attained by any artificial speech recognition system. The psychological and physiological studies of the human ear have shown that the ear incorporates a complex mechanical and neural system. The psychoacoustic phenomena that characterize the functions of the ear can be ascribed to the operation of the neural system of the ear. In order to successfully analyze sounds such as the sounds of speech, an electrical system including neural networks is provided which operates to reproduce many of the known psychoacoustic phenomena that characterize the functions of the human ear. To understand the operation of this electrical system, it is desirable to examine the human ear from a physiological point of view, and particularly to examine the cochlea, part of the inner ear, which transforms an auditory pattern into neural signals.

Mechanically, the cochlea is a spiral membrane which is filled with fluid. The cochlea is divided into two parts by the cochlear partition. Within the cochlear partition lie the sensory organs which translate the auditory pattern into impulses that tell the brain what is going on at the ear. The sensory organs are nevre cells known as hair cells. One end of the cochlea is connected to the stapes (stirrup) of the middle ear mechanism. The stapes is connected by way of the anvil and hammer to the ear drum. The ear drum is at the end of the ear canal which is connected to the ear flap. The ear flap is the visible portion of the ear at the exterior of the head. The cochlear partition moves in response to the sound waves which travel through the ear canal. It has been found that the part of the cochlear partition which vibrates at maximum amplitude depends upon the frequency (pitch) of the sound. The vibration is strongest near the stapes for high frequency sound and the point of strongest vibration moves toward the end of the cochlear partition farthest away from the stapes as the frequency of the sound decreases. A mechanical wave starts down the cochlear partition and reaches its maximum amplitude at a place corresponding to the frequency of the wave. The wave falls away rapidly beyond this point. Thus, the cochlear partition tends to separate the various frequencies of a stimulating wave. The portion of the partition which vibrates depends on the frequency of the wave and at very low frequencies, below 50 cycles per second, the cochlear partition vibrates as a whole. As pointed out above, this vibration is translated by the nerves in the cochlear partition into electrical signals. Since signals are generated at different places in the cochlea depending upon the frequency or pitch of the sound, the frequency separating action of the cochlea has been called the "place" theory of hearing.

There is another theory which accounts for the translation of auditory patterns into electrical signals in the cochlea. This is called the "volley" theory. According to this theory, the nerves in the cochlear partition generate sequences of electrical impulses, the repetition rate or number of impulses in the volleys depending upon the pitch of the sound. For low frequency sounds, the repetition rate or number of impulses is higher, since a group of biological neurons can generate more pulses during each cycle of the sound than for sounds of very high pitch. The volleys of impulses are also synchronized with the stimulating sound waves since the biological neurons are excited at a rate related to the frequency of the stimulating sound waves.

There are many psychoacoustic phenomena which may be accounted for in accordance with the place theory of hearing and other psychoacoustic phenomena which can be accounted for by the volley theory. Masking of high frequency sounds by low frequency sounds may be understood from the place theory. A low frequency tone will strongly vibrate the cochlear partition between the stapes and points of maximum vibration spaced beyond the stapes. The high frequency stimulation is, therefore, operative on an already strongly vibrating portion of the cochlear partition. The cochlear partition vibration due to a high frequency tone does not extend along the cochlear partition as far as the vibrations due to tones of low frequency. Accordingly, the low frequency tone is clearly perceived whereas the high frequency is masked or hidden by the low frequency.

A phenomenon which may be accounted for by the volley theory is the perception of the fundamental frequency of a sound containing many overtones, although the fundamental tone is not present. The volleys of impulses follow the envelope of the complex sound corresponding to the overtones. This frequency of the envelope corresponds to the frequency of the fundamental tones. Accordingly, the fundamental is perceived.

An artificial cochlea, capable of stimulating electrically many of the psychoacoustic phenomena of the cochlea, is also capable of analyzing auditory patterns and providing information as to the significant features of these patterns in a manner similar to the human ear. Based on this information, sounds of speech may be recognized.

Referring to FIG. 28, there is shown a simulated cochlea including a low pass filter structure or transmission line 320. The filter structure 320, it has been found, is characterized by an electrical response to audio frequency electrical signals of different frequency similar to the mechanical-electrical response of the cochlea to sound waves of different frequency. This filter structure 320 includes a plurality of filter sections, three of which 322, 324, and 326, are shown. The filter sections 322, 324 and 326 have successively lower cut-off frequencies. The structure 320 is terminated by a resistor 328 having a resistance equal to the characteristic impedance $R_c$ of the line 320. The low pass structure (line) 320 is driven by audio frequency electrical signals which are translated from sound signals by a microphone 330 and amplified by an amplifier 332. The amplifier 332 desirably has automatic gain control so that the line 320 is not overloaded by excessively high signal levels. Neurons 334, 336, and 338 of a primary level 340 of neurons, each of which corresponds to a different line section, are connected to their corresponding line 320 sections. Although only three neurons are shown for purposes of illustration, it will be appreciated that a different neuron is provided for each section of the structure 320. Neutrons 342, 344, and 346 of a second level 348 of neurons, also corresponding to different ones of the line sections, are connected separately between adjacent neurons in the primary level 340 of neurons.

The successive sections 322, 324, and 326 of the structure 320 are connected to excitatory input connections 350, 352 and 354 of the neurons 334, 336 and 338, respectively. These connections include rectifiers 356, 358, and 360 which pass positive currents. It will be recalled that the neurons illustrated are excited by positive currents and inhibited by negative currents. The excitatory connections 350, 352 and 354, respectively, include weighting resistors 362, 364, and 366. Although half wave rectifiers, in the form of the diodes 356, 358, and 360, are shown, the system may, alternatively, use full wave rectifiers such as bridge rectifier circuits. Inhibitory connections are also made to each of the neurons 334, 336, and 338 from the input to the low pass structure 320. These inhibitory connections include weighting resistors 368, 370, and 372 connected respectively to inputs of the neurons 334, 336, and 338. A rectifier in the form of a diode 374 which is polarized to pass negative current from the input of the structure 320 through the resistors 368, 370, and 372 is provided in the inhibition connections. The values of the resistors mentioned above are chosen to provide characteristics for the simulated cochlea system which simulate the threshold of hearing characteristic and equal loudness level characteristic of the human ear. These characteristics are illustrated in FIG. 29 which includes a family of curves T, $u$, $v$, $w$, $x$, and $y$ of differently perceived loudness levels for sounds of different intensity which vary in frequency. The curve T represents the normal threshold of hearing for sounds of different frequency. The curves $u$, $v$, $w$, $x$, and $y$ represent equally perceived loudness for different sound levels above the threshold of hearing. The upper-most curve y represents the threshold of feeling at which sounds are sufficiently intense to cause pain to the listener. The threshold of hearing curve shows that sounds below a certain frequency must be more intense than high frequency sounds below that frequency to be perceived by the human ear. To this end, the resistors 376, 378, and 380 and the other resistors in the successive sections 322, 324, 326, et seq., of the transmission line desirably introduce successively greater amounts of attenuation as the signals are transmitted along the line.

The values of these resistors may be obtained from the threshold of hearing curve T. For example, the resistor 376 may have the lowest value of resistance corresponding to the height of the curve at the cut-off frequency of the first filter section 322. The value of the resistance of the resistor 378 may correspond to the height of the curve at the cut-off frequency of the second filter section 324, less the value of resistance of the first resistor 376. The value of the resistor 380 corresponds to the height of the threshold of hearing curve at the cut-off frequency of its filter section 326, less than the sum of the values of resistance of the resistors 376 and 378. The resistance in each of the succeeding sections of the line 320 may be similarly chosen, having regard to the height of the threshold of hearing curve and the sum of the values of the resistors in the preceding sections of the line 320.

The values of resistance of the resistors 376, 378, and 380 and the other resistors in the various sections of the line will also depend upon the amplitude of the signals supplied by the amplifier 332. The resistance values are correspondingly higher for higher signal amplitude or lower signal amplitude. The curve T of FIG. 29 provides the relative values of the line resistors. The absolute values of these resistors may be derived by multiplying a constant representing a maximum value of resistance by factors, less than unity, which are obtained from the curve T, as specified above.

The resistors 362, 364, and 366 in the excitatory connections 350, 352, and 354 may be of equal values of resistance. Alternatively, the values of the resistors 362, 364, and 366 may be chosen to provide successively larger values of resistance corresponding to the height of the threshold of hearing cure T at the cut-off frequency of the sections of the line to which they are connected. The values of the resistors 362, 364, and 366 in the excitatory connections 350, 352 and 354 are, however, most suitably approximately the same. The values of these resistors may, however, differ somewhat to accommodate the various non-linearities in the threshold of hearing curve which are difficult to duplicate with the successively increasing attenuation provided by the resistors 376, 378, and 380 in the line 320. The values of these resistors 362, 364, and 366 may be greater or lesser than a mean value, e.g., 100 kilohms to accommodate such non-linearities.

The inhibition connections to the neurons in the primary level 340 provide over-all partial inhibition of these neurons. By over-all partal inhibition is meant that inhibitory inputs are applied to each of the neurons in the primary level regardless of the frequency of the input signals. In order that the neurons may be excited by signals of proper frequency, the amplitude of the inhibitory signal is made smaller than the amplitude of excitatory signals which should cause firing of appropriate neurons. To this end, the values of the inhibitory resistors 368, 370, and 372 are, respectively, greater than the values of the resistors 362, 364, and 366 in the excitatory connections 350, 352, and 354.

The values of the resistors 368, 370, and 372 are chosen to duplicate the equal loudness curves, for example, the curves u, v, w, x, and y in FIG. 29. Inhibition is made the strongest for the neurons which respond to inputs from those sections of the line near the input end thereof and is greatly diminished for those neurons connected to sections of the neurons farther down the line. The inhibition is made relatively weak for neurons at the very end of the line. In other words, the neurons which respond to higher frequency sound waves are inhibited strongly and the inhibition is gradually weakened for the neurons which respond to the lower frequency sound waves. The acuity of hearing for tones of different frequency becomes more uniform as the sound intensity is increased. When the threshold of feeling (curve y) is approached, the sensation of loudness becomes substantially the same for all frequencies. Because of the weighting resistors in the excitatory connections 350, 352, and 354 and the attenuation resistors 376, 378, and 380 in the line, the high frequency neurons are excited more readily than the low frequency neurons. The inhibitory connections equalize the signal required to excite the high frequency neurons and the low frequency neurons at high sound levels, since the high frequency neurons are inhibited more strongly than the low frequency neurons. Acordingly, the psychoacoustic phenomena of more uniform loudness with increased intensity is obtained.

Frequency discrimination, in accordance with the place theory of hearing, is obtained in the second level 348 of neurons. Neurons 342, 344, and 346 in the second level 340 are connected by excitatory connections 382, 384, and 386 to different ones of the neurons in the primary level 340 of neurons. Inhibitory connections 388, 390, and 392 are made, respectively, to the inputs of the neurons 342, 344, and 346. These inhibitory connections to the same second level neurons are obtained from neurons adjacent to the neurons which supply the excitatory connections. The excitatory and inhibitory connections include weighting resistors 394, 396, and 398 in the excitatory connections 382, 384, and 386, respectively, and resistors 400, 402, and 404 in the inhibitory connections.

The second level neurons each correspond to a different successive section of the line 320 and fire when sounds having a frequency equal to the cut-off frequency of their corresponding line sections are applied to the line 320. The resistors in the excitatory and in the inhibitory connections to the same second level neuron differ in value by the value of the line resistor in the section of the line corresponding to that second level neuron. The resistor in the excitatory connection has a greater value than the resistor in the inhibitory connection. For example, the value of the resistor 394 exceeds the value of the resistor 400 by the value of the resistor 376.

How the system operates to discriminate between sound signals of different frequency will be apparent from the following example. An input signal whose frequency is close to the cut-off frequency of the section 326 of the line 320 is assumed, for example, to be applied to the input of the line from the amplifier. Excitatory inputs are consequently applied to the neurons 334, 336, and 338 in the first level 340 of neurons which will exceed the inhibitory signals thereto. The first level neuron (not shown) succeeding the neuron 338 does not fire since cut-off occurs in the section 326 of the line 320. Since the inhibitory inputs to the second level neurons include resistors of smaller value than the excitatory inputs thereto, the excitatory inputs to the neurons 342 and 344 are less than the inhibitory inputs thereto, and the neurons 342 and 344 will not fire. However, the first level neuron (not shown) succeeding the neuron 338 is less heavily excited, thus producing less inhibition input to neuron 346. No inhibitory input is applied through the inhibitory connection 392 to the neuron 346. An excitatory output is, however, provided by the neuron 338. Accordingly, neuron 346 fires and provides an output c. The rate of firing corresponds to the intensity of the sound. The system of FIG. 28 is, therefore, capable of separating sounds of different frequencies. The primary level of neuron 340 operates to categorize sounds of different frequencies into broad categories by the firing rates of the neurons thereof. The neurons of the second level 348 recognize smaller differences in loudness and frequency of the tones so categorized by the primary level neurons. This process is similar to observed and psychoacoustic phenomena, since the average human ear is incapable of classifying sound into more than about seven ranges of frequencies and loudness. However, the human ear easily detects small differences in frequency and loudness between two tones or small loudness level changes in a single tone. Summarizing, the outputs *a*, *b*, and *c* of the neurons 342, 344, and 346 in the second level of neurons 348 is an indication of the frequency of the electrical signals, corresponding to tones impressed upon the transmission line 320, and the firing rates of these second level neurons is a measure of the loudness of these tones.

Solely by way of example, the following resistance values are suitable for the line attenuation resistors and for the weighting resistors:

| | |
|---|---|
| Resistor 376 | 100 ohms |
| Resistor 378 | 100 ohms |
| Resistor 380 | 100 ohms |
| Resistor 362 | 100 kilohms |
| Resistor 364 | 100 kilohms |
| Resistor 366 | 100 kilohms |
| Resistor 368 | 300 kilohms |
| Resistor 370 | 350 kilohms |
| Resistor 372 | 400 kilohms |
| Resistor 394 | 100 kilohms |
| Resistor 396 | 100 kilohms |
| Resistor 398 | 100 kilohms |
| Resistor 400 | 90 kilohms |
| Resistor 402 | 90 kilohms |
| Resistor 404 | 90 kilohms |

Another psychoacoustic response characteristic of second level neurons is an increase in the frequency range to which a neuron responds with increased excitation. This phenomenon is simulated in the system of FIG. 28 by a response of the same second level neuron to a broader and broader band of frequencies as the intensity (input amplitude) of the signal applied to the transmission line 320 increases. This response characteristic is shown in FIG. 30 for a particular second level neuron which responds to signals of approximately 2,000 cycles per second which just exceeds the firing threshold. The ordinate of this characteristic represents the input signal amplitude and the abscissa represents (on a log scale) the frequency of the input signals. The same neuron also responds to a signal of lower frequency and of much larger amplitude. The firing rate of the neuron is, however, greatest for the 2,000 cycles per second signal.

The characteristic shown in FIG. 30 follows from the operation of the transmission line 320. The cut-off characteristic of each section of the line is relatively abrupt. However, the attenuation characteristic is not so abrupt that an infinite amount of attenuation is introduced all at once at the cut-off frequency. Accordingly, for large amplitude signals, which are somewhat lower in frequency than the cut-off frequency of a specific section of the line, sufficient attenuation is introduced to cause some difference in the excitatory and inhibitory inputs to a second level 348 neuron to cause that neuron to fire. For lower signal levels of the same but below cut-off frequency, the neuron will not have fired. Accordingly, the second level neurons have a somewhat broad band response for high level signals. The firing rate of the second level neuron will, however, be greater for signals of the cut-off frequency of the line section corresponding to the second level neuron than for lower frequency signals of the same amplitude, as shown in FIG. 30.

Masking effects are obtained in the artificial cochlea of FIG. 28. For sounds of high intensity, low frequency signals tend to mask high frequency signals. This effect is attributable to the non-linear response of the circuit neuron to input stimulation. FIG. 3 shows that the output pulse rate of a neuron saturates at a certain rate with increasing input pulse rates or signal amplitude. Since a low frequency signal is transmitted further along the line 320 than a high frequency signal, a low frequency signal of high intensity causes all of the first level neurons to fire to the extent where the output pulse rate of these neurons tends to saturate. A superimposed high frequency signal adds little additional excitation which can further increase the firing rates of the neurons near the input end of the line. Accordingly, the low frequency signal is masked by the presence of the higher frequency signal.

The masking characteristic is illustrated in FIG. 31. The curve 410 shown by the dash lines illustrates the output firing rate of different first level neurons which are located at successively greater distances from the stapes or input end of the line. Thus, for a tone of about 1,000 cycles per second all of the first level neurons from the stapes up to the one which is connected to the section of the line that cuts off at 1,000 cycles per second fire. Only the neurons in the second level 348 which respond to the 1,000 cycles per second tone fire.

Curve 412 of FIG. 31 illustrates the firing characteristic of the primary level neurons, when a high intensity, low frequency signal is applied to the input end of the line. The ordinate of the curve represents the firing rate of the first level neurons, and the abscissa the frequency of the signals applied to the line 320. All of the neurons which are stimulated by the 1,000 cycles per second signal are stimulated to a larger degree by the low frequency signal. The low frequency signal saturates the neurons in the primary level so that the additional stimulation from the high frequency signals produces relatively little additional firing from those neurons which are also stimulated by the 1,000 cycles per second signal. This additional increase in firing rate is shown by the slight plateau in the high frequency end of the curve 412.

The artificial cochlea of FIG. 28 also operates in a manner which can be accounted for by volley theory. Volley effects in the artificial cochlea, analogously with its human counterpart, are most significant in accounting for low frequency effects. Volleys of output pulses arise because of the periodicity in the firing of the neurons in the second level 348 of neurons. This periodicity depends upon the frequency of low frequency signals and their relative amplitude. This effect, for a particular second level neuron which responds to an input signal of certain low frequency, is shown in FIG. 32. The rate of neuron firing depends upon the amplitude of the signal. Accordingly, a larger number of pulses are produced by the peaks of each signal than by the skirts thereof. Also, the greater the amplitude of the signal the more pulses can be produced during each cycle. These effects are apparent from FIG. 32 where it is shown that a larger number of pulses are produced by sine waves of larger amplitude than sine waves of the same frequency of lower amplitude. More pulses are also produced by the peaks of the sine waves than by the skirts thereof. The firing rate also varies sinusoidally. The neuron, thus, generates a volley of pulses for each positive half cycle of the sinewaves. These volleys repeat periodically at a rate corresponding to the frequency of the stimulating signal, and the pulse rate variation in each volley is characteristic of the type of signal which, in the illustrated case, is a sinusoidal signal. Similar effects may be obtained by using full wave instead of half wave rectifiers. In the case of full wave rectification, the volleys will correspond to each half cycle of the wave.

Another psychoacoustic phenomenon, mentioned above, is the ability of the human ear to perceive the missing fundamentals when listening to complex tones. FIG. 33 shows a complex tone in curve B thereof. This tone is constituted of sine waves of the second and third harmonics shown, respectively, by the dash curve and the solid curve A of FIG. 33. As noted from curve B of FIG. 33, the envelope of the complex wave has a frequency which is the fundamental frequency of the harmonic waves which make up the complex wave.

Neurons along the line 320, that is, before the point of cut-off of the highest frequency component, and near the input, are stimulated by this complex wave. The firing rate tends to be in synchronism with the envelope of the complex wave and thus produces volleys at a frequency corresponding ot the missing fundamental.

The outputs of the second level neurons $a$, $b$, $c$, et seq., therefore, characterize the psychoacoustic phenomenon explained above. These outputs may be applied to the inputs of a neurological information processing system such as shown in FIG. 27a and FIG. 27b for abstracting maxima-minima slopes, priority and other features which, when taken in combination, activate different response units which respond to and recognize different phonemes. Other parts of speech, such as words and syllables, may also be recognized.

Referring to FIG. 34, there is shown another embodiment of an artificial cochlea. A low pass filter structure or transmission line 414, similar to the line 320, is used. Acoustic signals are applied to this line by means of a microphone 416 and an amplifier 418, similar to the microphone 330 and amplifier 332. The line 414 has successive sections 420, 422, 424 of successively lower cut-off frequency. Additional sections are present in the line, but are not shown to simplify the illustration. Resistors 426, 428 and 430 in different sections of the line 414 have resistance values which facilitate the obtainment of the threshold of hearing characteristic of the system. The values of these resistors may be selected based on the same considerations as the values for the resistors 376, 378 and 380 (FIG. 28). Excitatory connections 432 and inhibiting connections 434 are made to different neurons 436, 438 and 440, respectively, from successive adjacent sections of the line. Thus, the first neuron 436 is excited by the first section of the line and inhibited by the second section of the line. The excitatory connections include a diode 442, polarized to conduct positive current, and weighting resistors 444. The inhibitory connections include diodes 446, which are polarized to conduct negative current, and resistors 448. The values of the resistors 444 and 448 differ by the value of the line attenuation, resistors 426, 428 and 430 in the section of the line across which they are connected. Frequency selection is, therefore, obtained since a neuron will be equally excited and inhibited except in that section of the line at which cut-off occurs. In other words, only the neuron which receives differential excitation will fire and that neuron will fire only for signals of a frequency at which cut-off occurs in the section of the line from which the excitatory input to the neuron is obtained.

The neurons 436, 438 and 440, respectively, provide outputs $a$, $b$, and $c$ in response to signals of digerent frequency applied to the line 414. The firing rate of these neurons depends upon the amplitude of the signals applied to the line.

Masking effects are obtained through the use of weighted inhibitory connections from successive lower frequency neurons to higher frequency neurons. Three of these connections are shown in FIG. 34 to the first or high frequency neurons 436 and one to the second neuron 438. It will be appreciated that more connections, depending upon the number of neurons in the system, are provided. The number of connections decreases arithmetically by one to each successively lower frequency neuron. The first of these connections 450 between the $y$ or inhibitory output of the neuron 438 and an input of the first neuron 436 is through a weighting resistor 452. A second connection 454 is made from the inhibitory output of the third neuron 440 through a weighting resistor 456 to an input of the first neuron 436. The same $y$ output of the third neuron is connected through a weighting resistor 458 to an input of the second neuron 438. The values of the resistor 452 and 456 are higher than the values of the resistors 444 and 448 in the excitatory and inhibitory connections 432 and 434 so that lower frequency signals only mask the excitation of the neuron 436 by decreasing the excitatory input thereto, rather than inhibit the neuron 436 entirely. Since the lower the frequency of the masking signal the greater the masking effect, the resistor 456 is of lower resistance than the resistor 452, because the neuron 440 responds to lower frequency signals than the neuron 438.

While the system of FIG. 34 is somewhat less complex than the system of FIG. 28, the system of FIG. 28 simulates more psychoacoustic phenomena such as the fundamental frequency perception and the like.

From the foregoing description, it will be apparent that there have been provided neural circuits, networks, and systems which are suitable for use in abstracting and processing information. Several exemplary circuits, neural networks and neural systems for pattern recognition and/or information processing have been shown and described herein. Variations in these circuits and systems coming within the spirit and scope of the invention will, no doubt, suggest themselves to those skilled in the art. Hence, the foregoing should be considered illustrative and not in any limiting sense.

What is claimed is:

1. Electrical apparatus for simulating the cochlea, which apparatus comprises means responsive to acoustic signals for separating such signals into a plurality of output signals representing successively smaller portions of the acoustic spectrum, first and second pluralities of electrical circuit neurons, means responsive to different ones of said plurality of output signals for separately exciting each of said first plurality of said neurons to provide neuron output signals therefrom, and means responsive to those of said neuron output signals from different pairs of said first plurality of neurons for, respectively, exciting and inhibiting individual ones of a second plurality of said neurons, each of said second plurality of neurons providing output signals representing different frequency components of said acoustic signals.

2. Electrical apparatus for simulating the cochlea, which apparatus comprises means responsive to electrical signals representing acoustic energy for separating said signals into a plurality of output signals corresponding to successively smaller portions of the frequency spectrum of said acoustic signals, a plurality of electrical circuit neurons, each having inputs and also having excitatory and inhibitory outputs which depend on how much input excitation thereto exceeds a predetermined threshold, a number of said plurality of neurons being arranged adjacent to each other in a first level and another number of said neurons being arranged adjacent to each other in a second level, means for applying said plurality of output signals individually to the inputs of successive ones of said first level neurons, and means for connecting the excitatory and inhibitory outputs of the neurons of adjacent pairs of said first level neurons respectively to the inputs of individual, adjacent ones of said second level neurons, whereby the outputs of said second level neurons correspond to different frequency components of said electrical signals separated by said first-named means.

3. Electrical apparatus for simulating the cochlea, which apparatus comprises a transmission line having successive sections each of which passes electrical signals of successively lower frequency, means for applying electrical signals corresponding to acoustic energy to said line, a first plurality of electrical circuit neurons, each corresponding to a different one of said sections and each connected to its corresponding section of said line, a second plurality of said electrical circuit neurons, each also corresponding to a different one of said sections, means responsive to outputs of different ones of said first plurality of neurons for exciting individual ones of said second plurality of neurons which correspond respectively to the same one of said sections, and means responsive to the output of different ones of said first plurality of neurons for inhibiting individual ones of said second plurality of neurons which correspond, respectively, to successive adjacent ones of said sections of said line, whereby to derive outputs from each of said second plurality of neurons corresponding to different frequency components of the signals applied to said line.

4. Electrical apparatus for simulating the cochlea, which apparatus comprises a transmission line having an input and a plurality of successive sections each of which are of successively lower cut-off frequency, said section of highest cut-off frequency being connected to said input, a plurality of electrical circuit neurons, each having an input and providing output pulses in response to excitatory input signals thereto which exceed a predetermined threshold, the rate of said output pulses depending upon how much said excitatory input signals exceed said threshold, means for applying excitatory input signals from different sections of said line to separate ones of each of a first group of said neurons, and means for applying output pulses from different pairs of said first group of neurons which are connected to adjacent sections of said line to the inputs of different ones of a second group of said plurality of neurons.

5. Electrical apparatus for simulating the cochlea, which apparatus comprises means responsive to acoustic signals for separating such signals into output signals representing successively smaller portions of the acoustic frequency spectrum, a first plurality of electrical circuit neurons, means responsive to different ones of said output signals for separately exciting said neurons, means responsive to said acoustic signals for partially inhibiting each of said circuit neurons, and another plurality of circuit neurons, and means responsive to the outputs of different pairs of said first plurality of circuit neurons for respectively exciting and inhibiting different ones of said other plurality of circuit neurons.

6. Electrical apparatus which simulates the cochlea, said apparatus comprising a transmission line having an input and including a plurality of low-pass filter sections connected to each other in order of their cut-off frequencies, each of said sections including a different resistor, each having a resistance value which is a function of the height of the threshold of hearing characteristic of the human ear at the cut-off frequency of the one of said sections in which it is included; a plurality of electrical circuit neurons, each having an input and a pair of outputs and each being responsive to excitatory input signals and inhibitory input signals for providing on different ones of said pair of outputs, excitatory and inhibitory output signals also, when the magnitude of the excitatory signals thereto exceed a certain threshold; a first number of said plurality of neurons being arranged in a first level, each of said first level neurons corresponding to a different one of said sections; a second number of said plurality of neurons arranged in a second level each of said second level neurons also corresponding to a different one of said sections; means for applying excitatory signals separately from sections of said line to the inputs of said first level neurons corresponding thereto, means for applying inhibitory signals of smaller magnitude than said excitatory signals to the inputs of each of said first level neurons from the input of said line, means for connecting the excitatory outputs and the inputs of correspondingly ordered ones of said neurons in said first and second level, and means for connecting the inputs of said second level neurons with the inhibitory outputs of said first level neurons corresponding to adjacent ones of said line sections.

7. Electrical apparatus which simulates the cochlea, said apparatus comprising a transmission line having an input and including a plurality of low-pass filter sections the one of said sections of highest cut-off frequency being connected to said input, said sections being connected to each other in descending order of their cut-off frequencies, each of said sections including a different resistor, each having a resistance value which is a function of the height of the threshold of hearing characteristic of the human ear at the cut-off frequency of the one of said sections in which it is included; a plurality of electrical circuit neurons, each having an input and a pair of outputs and each being responsive to excitatory input signals of one, and inhibitory input signals of the other, of two opposite polarities for providing on different ones of said pair of outputs, excitatory and inhibitory output signals also, respectively, of said one and said other polarity when the magnitude of the excitatory signals thereto exceed a certain threshold; a first number of said plurality of neurons being arranged in a first level, each of said first level neurons corresponding to a different one of said sections; a second number of said plurality of neurons arranged in a second level, each of said second level neurons also corresponding to a different one of said sections; separate excitatory connections between each section of said line and the input of one of said first level neurons correspondingly thereto, said excitatory connections each including a rectifier polarized to pass signals of said one polarity and a resistor; inhibitory connections between the input each of said first level neurons and said input of said line, said connections including a rectifier for passing signals of said other polarity and a plurality of resistors connected separately to the inputs of different ones of said first level neurons, the value of each of said resistors in said inhibitory connections being a function of the cut-off frequency of the one of said sections corresponding to the neurons connected thereto, which function depends upon the height of the equal loudness characteristics of the human ear at said last-named cut-off frequency, first connections between the excitatory outputs of each of said first level neurons and the inputs of correspondingly ordered ones of said second level neurons which correspond to the same line sections; second connection between the inhibitory outputs of each said first level neurons and the inputs of each of said second level neurons which correspond respectively to adjacent sections of said line of higher cut-off frequency and of lower cut-off frequency and separate resistors in said first and second connections to each of said second level neurons which differ in value of resistance by the value of resistance included in the section of said line corresponding to said each second level neuron, the one of said resistors in said first connection to said each second level neurons having a resistance value smaller than the resistor in said second connection to said each second level neuron.

References Cited by the Examiner

UNITED STATES PATENTS

| 2,851,661 | 9/58 | Buland | 179—1 |
| 2,857,465 | 10/58 | Schroeder | 179—1 |
| 2,866,001 | 12/58 | Smith | 179—1 |
| 2,908,761 | 10/59 | Raisbeck | 179—1 |
| 3,045,911 | 7/62 | Russell et al. | 235—151 |
| 3,097,349 | 7/63 | Putzrath et al. | 340—172.5 |
| 3,103,648 | 9/63 | Hartmanis | 340—172.5 |
| 3,106,699 | 10/63 | Kamentsky | 340—172.5 |

OTHER REFERENCES

"The Analysis and Automatic Recognition of Speech Sound," by C. P. Smith, Electronic Engineering, August 1952, pps. 368–372.

"What Good Are Artificial Neurons," by Von Bergejk et al., Bell Telephone Labs., Bronic's Symposium, 13–15, September 1960, Wadd Tech Reports, 60–600, pages 395–406.

ROBERT H. ROSE, *Primary Examiner.*